United States Patent
Lee

(10) Patent No.: US 11,120,081 B2
(45) Date of Patent: Sep. 14, 2021

(54) KEY-VALUE STORAGE DEVICE AND METHOD OF OPERATING KEY-VALUE STORAGE DEVICE

(71) Applicant: SAMSUNG ELECTRONICS CO., LTD., Suwon-si (KR)

(72) Inventor: Ju-Pyung Lee, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 361 days.

(21) Appl. No.: 16/100,990

(22) Filed: Aug. 10, 2018

(65) Prior Publication Data

US 2019/0155959 A1 May 23, 2019

(30) Foreign Application Priority Data

Nov. 23, 2017 (KR) .................. 10-2017-0157503

(51) Int. Cl.
*G06F 16/84* (2019.01)
*G06F 16/901* (2019.01)
*G06F 3/06* (2006.01)

(52) U.S. Cl.
CPC ........ *G06F 16/9014* (2019.01); *G06F 3/0604* (2013.01); *G06F 3/0638* (2013.01); *G06F 3/0688* (2013.01)

(58) Field of Classification Search
CPC .. G06F 16/9014; G06F 3/0604; G06F 3/0638; G06F 3/0688
USPC .......................... 707/741–747; 711/103, 108
See application file for complete search history.

(56) References Cited

U.S. PATENT DOCUMENTS

| | | | |
|---|---|---|---|
| 5,784,699 A * | 7/1998 | McMahon | G06F 12/023 711/170 |
| 7,430,560 B1 * | 9/2008 | Mittal | G06F 16/9027 |
| 7,702,693 B1 * | 4/2010 | Aiyagari | G06F 21/6218 707/785 |
| 7,788,240 B2 | 8/2010 | Rossmann | |
| 8,266,176 B2 * | 9/2012 | Nakamura | G06F 21/6218 707/781 |
| 8,635,402 B2 | 1/2014 | Torii | |
| 8,908,978 B2 | 12/2014 | Oka et al. | |
| 9,075,710 B2 | 7/2015 | Talagala et al. | |
| 9,390,774 B2 * | 7/2016 | Sharon | G11C 7/1006 |
| 9,990,249 B2 * | 6/2018 | Durham | G06F 12/0886 |
| 10,056,937 B1 * | 8/2018 | Neff | H04B 1/70735 |
| 10,303,899 B2 * | 5/2019 | Durham | G06F 21/57 |

(Continued)

FOREIGN PATENT DOCUMENTS

JP 2015028815 A 2/2015

*Primary Examiner* — Hanh B Thai
(74) *Attorney, Agent, or Firm* — Volentine, Whitt & Francos, PLLC

(57) ABSTRACT

A key-value storage device includes a non-volatile memory and a controller. A method of operating the key-value storage device includes: receiving, from a host, information regarding at least one of a random region, comprising random bits, and a non-random region each included in a key; receiving, from the host, a first command including a first key; generating, based on the received information, a mapping index of a mapping table from first bits, the first bits corresponding to at least some of the random bits included in the first key; and controlling an operation for the non-volatile memory, according to the first command, by using the mapping table.

20 Claims, 26 Drawing Sheets

(56) References Cited

U.S. PATENT DOCUMENTS

| | | | | |
|---|---|---|---|---|
| 2003/0218978 A1* | 11/2003 | Brown | ............... | H04L 49/3009 370/230 |
| 2006/0182199 A1* | 8/2006 | Hong | ................... | H04L 1/1816 375/299 |
| 2006/0282610 A1* | 12/2006 | Dariel | .................. | G06F 3/0679 711/103 |
| 2008/0112401 A1* | 5/2008 | Brown | ............... | G06F 16/9014 370/383 |
| 2008/0233966 A1* | 9/2008 | Scheim | ................ | H04L 5/0058 455/452.1 |
| 2009/0024643 A1* | 1/2009 | Mittal | ................ | G06F 16/9027 |
| 2010/0161879 A1* | 6/2010 | Nation | ............... | G06F 12/0813 711/103 |
| 2010/0161908 A1* | 6/2010 | Nation | ............... | G06F 12/0284 711/147 |
| 2012/0030242 A1* | 2/2012 | Nakamura | ......... | G06F 21/6218 707/781 |
| 2013/0250686 A1 | 9/2013 | Marukame et al. | | |
| 2013/0275656 A1* | 10/2013 | Talagala | ............. | G06F 12/0246 711/103 |
| 2014/0122791 A1* | 5/2014 | Fingerhut | .............. | G11C 15/00 711/108 |
| 2014/0129530 A1* | 5/2014 | Raufman | ........... | G06F 16/2365 707/693 |
| 2015/0120754 A1* | 4/2015 | Chase | ................ | G06F 16/2255 707/747 |
| 2015/0169467 A1* | 6/2015 | Chase | ................ | G06F 16/9014 711/216 |
| 2016/0103869 A1* | 4/2016 | Raufman | ............. | G06F 16/901 707/693 |
| 2016/0217167 A1 | 7/2016 | Zhang et al. | | |
| 2016/0259724 A1* | 9/2016 | Steele, Jr. | ........... | G06F 12/1018 |
| 2017/0060439 A1* | 3/2017 | Harasawa | ............ | G06F 3/0656 |
| 2017/0185532 A1* | 6/2017 | Durham | ................. | G06F 21/00 |
| 2017/0220299 A1 | 8/2017 | Foong et al. | | |
| 2018/0189172 A1* | 7/2018 | Kim | ..................... | G06F 11/108 |
| 2018/0247082 A1* | 8/2018 | Durham | ................. | G06F 21/57 |
| 2018/0373895 A9* | 12/2018 | Durham | ................. | G06F 21/53 |

\* cited by examiner

KEY-VALUE STORAGE DEVICE AND METHOD OF OPERATING KEY-VALUE STORAGE DEVICE

CROSS-REFERENCE TO RELATED APPLICATION

This application claims the benefit of Korean Patent Application No. 10-2017-0157503, filed on Nov. 23, 2017, in the Korean Intellectual Property Office, the disclosure of which is incorporated herein in its entirety by reference.

BACKGROUND

The inventive concept relates to a key-value storage device and a method of operating the key-value storage device.

Storage may be classified into object-based storage and block-based storage, depending upon units of data management. Object-based storage is a structure in which data is stored and managed in the form of an object. An object refers to data having an arbitrary size, for example, multimedia data and files, such as videos, images, and the like, and object storage may be used to manage objects. An example of object-based storage is a key-value storage device.

SUMMARY

According to an aspect of the inventive concept, a storage system comprises: a controller configured to receive from a host: a key encoding rule, and a command including a key, wherein the key includes at least some random bits, wherein the controller is further configured to generate, based on the key encoding rule, a mapping index from bits corresponding to at least some of the random bits included in the key, and is further configured to store, in a mapping table, mapping information corresponding to the mapping index; and a non-volatile memory configured to store, under control of the controller and according to the mapping information, the key and a value corresponding to the key.

According to another aspect of the inventive concept, there is provided a method of operating a key-value storage device, wherein the key-value storage device includes a non-volatile memory and a controller configured to control the non-volatile memory. The method includes: receiving, by the controller, from a host, information regarding at least one of a random region, comprising random bits, and a non-random region, each included in a first key; receiving, by the controller, from the host, a first command including the first key; generating, by the controller, based on the received information, a mapping index of a mapping table from first bits, the first bits corresponding to at least some of the random bits included in the first key; and controlling, by the controller, an operation for the non-volatile memory, according to the first command, by using the mapping table.

According to a further another aspect of the inventive concept, there is provided a method of operating a key-value storage device, wherein the key-value storage device includes a plurality of non-volatile memories and a controller configured to control the plurality of non-volatile memories. The method includes: receiving, by the controller, from a host, information regarding at least one of a random region, comprising random bits, and a non-random region, each included in a first key; receiving, by the controller, from the host, a first command including the first key; allocating, by the controller, based on the received information, the first command to a first non-volatile memory among the plurality of non-volatile memories, according to at least a second bit among the random bits included in the first key; generating, by the controller, based on the received information, a mapping index of a first mapping table from first bits, the first mapping table corresponding to the first non-volatile memory, and the first bits corresponding to at least some of the random bits included in the first key; and controlling, by the controller, an operation for the first non-volatile memory according to the first command, by using the first mapping table.

According to yet another aspect of the inventive concept, there is provided a method of operating a key-value storage device, wherein the key-value storage device includes a non-volatile memory and a controller configured to control the non-volatile memory. The method includes: receiving, by the controller, from a host, information regarding at least one of a random region, comprising random bits, and a non-random region, each included in a key; receiving, by the controller, from the host, a first command including a first value; generating, by the controller, the first key from the first command, based on the received information; generating, by the controller, based on the received information, a mapping index of a mapping table from first bits, the first bits corresponding to at least some of the random bits included in the first key; and controlling, by the controller, an operation for the non-volatile memory according to the first command, by using the mapping table.

According to still another aspect of the inventive concept, there is provided a method of operating a key-value storage device, wherein the key-value storage device includes a plurality of non-volatile memories and a controller configured to control the plurality of non-volatile memories. The method includes: receiving, by the controller, from a host, information regarding at least one of a random region, comprising random bits, and a non-random region each included in a first key; receiving, by the controller, from the host, a first command including a first value; generating, by the controller, based on the received information, the first key from the first command; allocating, by the controller, the first command to a first non-volatile memory among the plurality of non-volatile memories, according to at least a second bit among random bits included in the first key, based on the received information; generating, by the controller, a mapping index of a first mapping table from first bits, based on the received information, the first mapping table corresponding to the first non-volatile memory, and the first bits corresponding to at least some of the random bits included in the first key; and controlling, by the controller, an operation for the first non-volatile memory according to the first command, by using the first mapping table.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Figure 1:
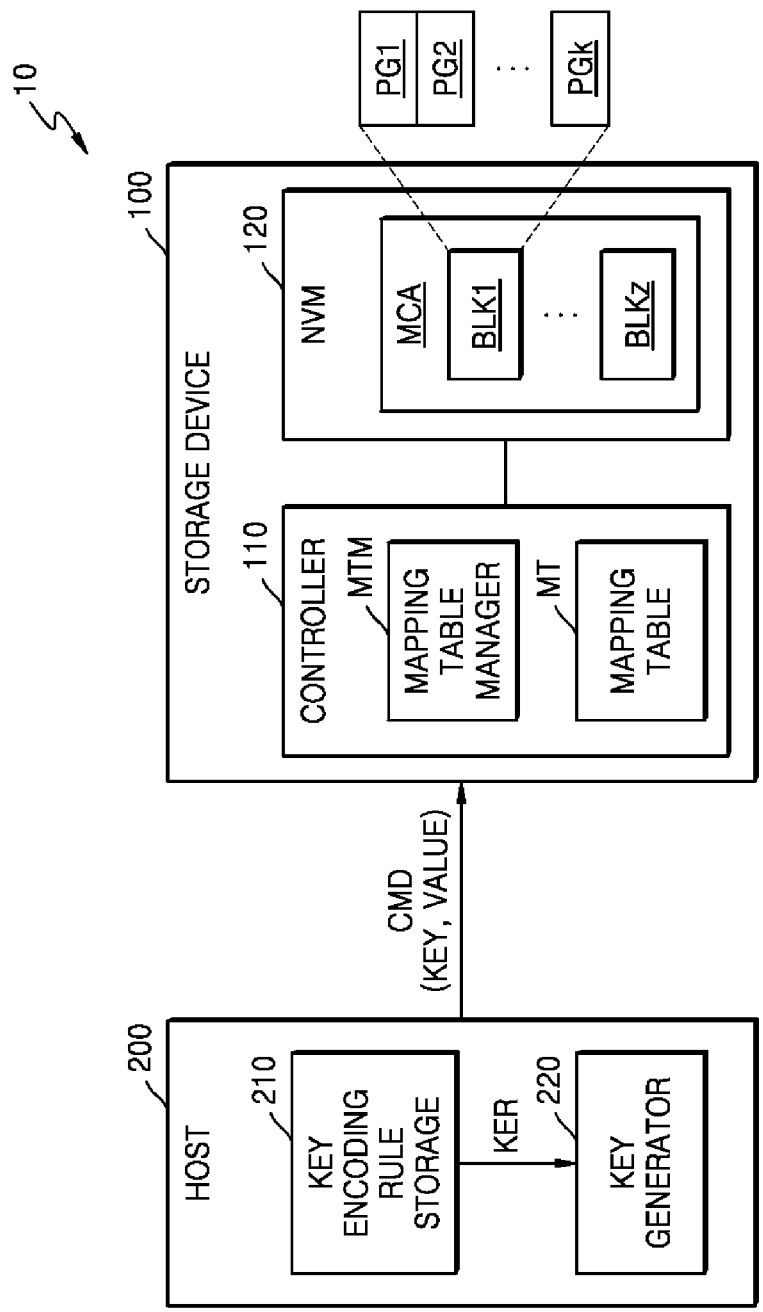
FIG. 1 is a block diagram illustrating an embodiment of a storage system.

FIG. 1 is a block diagram illustrating an embodiment of a storage system 10. Referring to FIG. 1, storage system 10 may include a storage device 100 and a host 200, and storage device 100 may include a controller 110 and a non-volatile memory (NVM) 120. Host 200 may communicate with storage device 100 via various interfaces. For example, host 200 may be implemented with an application processor (AP) or a system-on-chip (SoC).

In an embodiment, storage device 100 may be a key-value storage device or a key-value store, for example, a key-value solid state drive (SSD). The key-value storage device is a device for quickly and simply processing data by using a key-value pair. Here, the term "key-value pair" refers to a pair of a key having uniqueness and a value that is data corresponding to the key, and may referred to as the term "tuple" or "key-value tuple". In the key-value pair, a key may be represented by an arbitrary string such as a file name, a uniform resource identifier (URI), or a hash, and a value may be an arbitrary kind of data such as an image, a user preference file, or a document. Here, sizes of the key and the value may be variable, and, for example, a size of the value may vary with data included in the value.

Hereinafter, an embodiment, in which storage device 100 is a key-value storage device, will be mainly described, and in the specification, storage device 100 may have substantially the same meaning as a key-value storage device or a key-value store. However, storage device 100 is not limited to the key-value storage device, and may be applied to an arbitrary object cache system or object storage system managing data in units of an object. Therefore, storage device 100 may manage data in units of an object, in an arbitrary manner rather than in the manner of a key-value pair.

Host 200 may transmit, to storage device 100, a command CMD including a key-value pair, for example, a write request or a put command, and storage device 100 may write a value into non-volatile memory 120 in response to the command CMD. In an embodiment, host 200 may transmit, to storage device 100, a command CMD including a key, for example, a read request or a get command, and the storage device 100 may read a value corresponding to the key from non-volatile memory 120 in response to the command CMD. Without converting a key into units of logical block addresses (LBAs) having a fixed size, host 200 may generate the command CMD including the key having a variable size and may transmit the generated command CMD to storage device 100.

Controller 110 may control non-volatile memory 120 such that a value is written into non-volatile memory 120 in response to a write request from host 200, or such that a value stored in non-volatile memory 120 is read in response to a read request from host 200. In an embodiment, controller 110 may include a mapping table manager MTM and a mapping table MT. Although FIG. 1 illustrates that the mapping table MT is included in controller 110, embodiments are not limited thereto, and in some embodiments, the mapping table MT may be loaded into a memory chip external to a controller chip, for example, into a DRAM chip, the controller chip including controller 110 implemented therein.

The mapping table manager MTM may generate a mapping index of the mapping table MT from the key included in the command CMD. In addition, the mapping table manager MTM may update, to the mapping table MT, mapping data corresponding to the mapping index, or may retrieve, from the mapping table MT, the mapping data corresponding to the mapping index. The mapping table MT stores a plurality of mapping data, and each mapping datum may indicate a physical address corresponding to the mapping index. In an embodiment, the mapping index may be a hashed key corresponding to the key, and the physical address may be a physical page number (PPN) of non-volatile memory 120 for writing a value corresponding to the key. Thus, the mapping table MT may be referred to as a hashed table. The mapping table manager MTM and the mapping table MT will be described in more detail with reference to FIG. 2.

Non-volatile memory 120 may include a memory cell array MCA, the memory cell array MCA may include memory blocks BLK1 to BLKz, and a memory block BLK1 may include a plurality of pages PG1 to PGk. Here, each of z and k may be a positive integer, and may be variously changed depending upon embodiments. For example, a memory block may be a unit of erasure, and a page may be a unit of writing and reading. In some embodiments, the memory cell array MCA may include a plurality of planes, a plurality of dies, or a plurality of chips. In an embodiment, non-volatile memory 120 may include a flash memory device, for example, a NAND flash memory device. However, the embodiments are not limited thereto, and non-volatile memory 120 may include a resistive memory device such as resistive random access memory (ReRAM), phase change RAM (PRAM), or magneto-resistive RAM (MRAM).

Storage system 10 may be implemented with, for example, a personal computer (PC), a data server, network-attached storage, an Internet-of-Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, e-book, a wearable device, or the like.

In some embodiments, storage device 100 may be internal memory embedded in an electronic device. For example, storage device 100 may be an SSD, an embedded universal flash storage (UFS) memory device, or an embedded multimedia card (eMMC). In some embodiments, storage device 100 may be external memory attachable to and detachable from an electronic device. For example, storage device 100 may be a UFS memory card, a Compact Flash (CF) memory card, a Secure Digital (SD) memory card, a Micro-Secure Digital (Micro-SD) memory card, a Mini-Secure Digital (Mini-SD) memory card, an extreme Digital (xD) memory card, or a memory stick.

Figure 2:
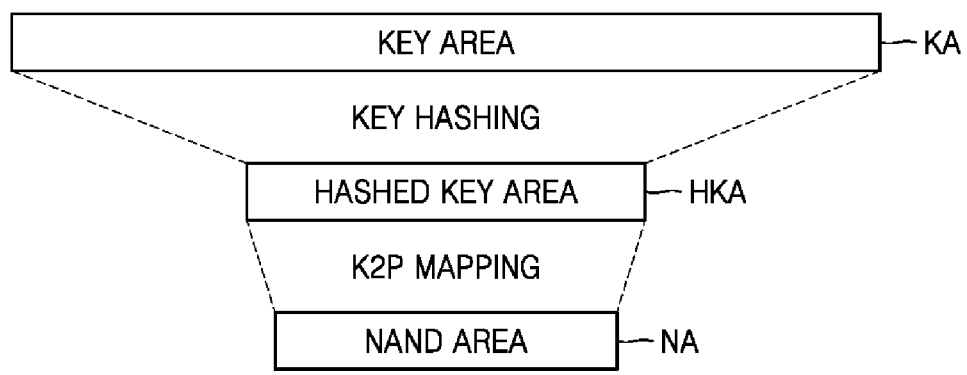
FIG. 2 illustrates examples of a key area, a hashed key area, and a NAND area, according to an embodiment.

FIG. 2 illustrates examples of a key area KA, a hashed key area HKA, and a NAND area NA, according to an embodiment.

Referring to FIGS. 1 and 2, host 200 and storage device 100 may transmit and receive key data defined in the key area KA. The key data may have a variable size, and may have an extremely large size depending upon embodiments. Since the mapping table MT is loaded into memory having a limited capacity, when the size of the key data is extremely large, it may be difficult to store the key data in the memory. Therefore, controller 110 may perform a hashing operation on the key data defined in the key area KA, thereby generating a hashed key in the hashed key area HKA. For example, storage device 100 may perform the hashing operation on a 128-bit key, thereby generating a 32-bit hashed key.

The mapping table MT may use the generated hashed key as a mapping index, and may store mapping data on a mapping index basis. The mapping data may include a physical address for storing a value in non-volatile memory 120, for example, the NAND area NA. As such, the mapping data may indicate a corresponding relation of the hashed key to the physical address, for example, to a physical page number (PPN), and thus, the mapping table MT may be referred to as a Key-to-PPN (K2P) mapping table.

For example, as a result of performing the hashing operation on first key data and performing the hashing operation on second key data, an identical first hashed key, that is, an identical first mapping index, may be generated for both performances of the hashing operations (i.e., on the first key data, and on the second key data). In the mapping table MT, when a physical address of a first value corresponding to the first key data has been already stored in correspondence with the first mapping index, a physical address of a second value corresponding to the second key data may be stored in correspondence with another mapping index instead of the first mapping index. As such, as a result of performing the hashing operation on a plurality of key data, the case where an identical hashed key for different key data is generated may be referred to as the term "hashing collision." There is a need for a method of storing the mapping data in the mapping table MT such that the mapping data is uniformly dispersed in the mapping table MT simultaneously with reducing such hashing collision.

Referring again to FIG. 1, host 200 may include key encoding rule storage 210 and a key generator 220. In an embodiment, key encoding rule storage 210 and key generator 220 may be implemented with software. In an embodiment, host 200 may include a storage device controller controlling storage device 100, and key encoding rule storage 210 and key generator 220 may be implemented in the storage device controller. For example, host 200 may include a key-value control module (for example, KVMa of FIG. 15 or KVMb of FIG. 23, discussed in greater detail below) controlling the key-value storage device, and key encoding rule storage 210 and key generator 220 may be implemented in the key-value control module.

Key encoding rule storage 210 may store a key encoding rule KER commonly applicable to a plurality of keys. The key encoding rule KER may indicate information regarding at least one of a random region and a non-random region of a key. In an embodiment, key encoding rule storage 210 may store, together, the key encoding rule KER and a corresponding encoding identifier (ID). Key generator 220 may receive the key encoding rule KER from key encoding rule storage 210, and may generate a key according to the received key encoding rule KER. In some embodiments, host 200 may change the key encoding rule, key encoding rule storage 210 may store a new key encoding rule and a corresponding new encoding ID, and key generator 220 may generate a key according to the new key encoding rule.

Figure 3:
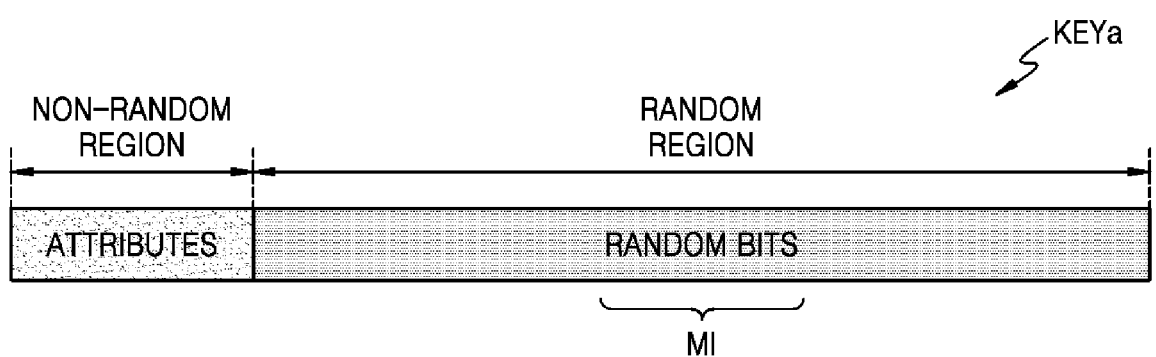
FIG. 3 illustrates an example of a key generated according to a key encoding rule, according to an embodiment.

FIG. 3 illustrates an example of a key KEYa generated according to a key encoding rule, according to an embodiment.

Referring to FIGS. 1 and 3, the key KEYa may have a variable size, for example, a size of tens to hundreds of bits. The key KEYa may be divided into a random region including random bits, and a non-random region including attribute information. The non-random region may include attribute information regarding a value associated with the key, and the attribute information may be represented by bits having a certain pattern. For example, when the value is a picture file, the attribute information may be '0001', and when the value is a video file, the attribute information may be '0002'. For example, when host 200 transmits first and second commands for picture files to storage device 100, attribute information of a first key included in the first command may be identical to attribute information of a second key included in the second command, and thus, there is a possibility of the occurrence of hashing collision by which a hashed key corresponding to the first key and a hashed key corresponding to the second key are generated to be identical to each other.

According to an embodiment, host 200 may transmit the key encoding rule KER to storage device 100, before transmitting the command CMD including the first or second key. In an embodiment, when power is applied to storage system 10, host 200 may transmit the key encoding rule KER to storage device 100. In an embodiment, the key encoding rule KER may be transmitted in the form of a set feature command. In an embodiment, the key encoding rule KER may be transmitted in the form of a bit mask. For example, the key encoding rule KER may be represented by the random region and the non-random region which have different bits. As another example, the key encoding rule KER may be represented by a start bit and an end bit of the random region. According to an embodiment, the key encoding rule KER may be different for each size of the key.

When storage device 100 receives the command CMD from host 200, storage device 100 may generate a mapping index MI from the random bits of the key included in the command CMD, based on the previously received key encoding rule KER. Specifically, the mapping table manager MTM may generate the mapping index MI from at least partial bits out of the random bits of the key. In an embodiment, the mapping table manager MTM may use at least partial bits out of the random bits of the key as the mapping index MI without performing the hashing operation on the at least partial bits. Therefore, even in the case where the attribute information included in the non-random region of the first command is identical or similar to the attribute information included in the non-random region of the second command, first and second mapping indices may be generated from at least partial bits included in the respective random regions of the first and second commands, thereby reducing a possibility of the occurrence of hashing collision.

Figure 4:
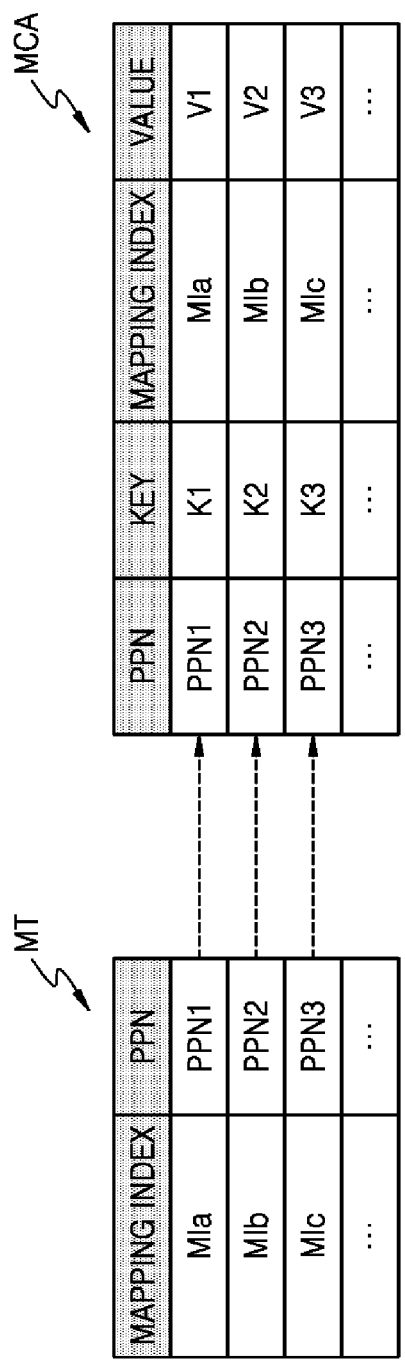
FIG. 4 illustrates an example of a mapping table and an example of a memory cell array of non-volatile memory, according to an embodiment.

FIG. 4 illustrates an example of the mapping table MT and an example of the memory cell array MCA of the non-volatile memory, according to an embodiment.

Referring to FIGS. 1 and 4, controller 110 may receive, from host 200, a first command including a first key K1 and a first value V1. Controller 110 may generate a first mapping index MIa from at least some of random bits ("partial random bits") of the first key K1, based on the key encoding rule KER. For example, the first mapping index MIa may be determined to be identical to partial random bits included in the first key K1. Controller 110 may store, as PPN1, a physical address for writing the first value V1, in a mapping entry corresponding to the first mapping index MIa in the mapping table MT. Thus, the first key K1, the first mapping index MIa, and the first value V1 may be written into PPN1 of the memory cell array MCA of non-volatile memory 120. Next, when controller 110 receives a second command from host 200, controller 110 may generate a second mapping index MIb from at least some of random bits of a second key K2. In addition, when controller 110 receives a third command from host 200, controller 110 may generate a third mapping index MIc from at least some of random bits of a third key K3.

As described above, according to the present embodiment, storage device 100 may include the mapping table manager MTM, and the mapping table manager MTM may generate the mapping index MI from partial random bits of the key, based on the key encoding rule KER received in advance. In an embodiment, the mapping table manager MTM may intactly use partial random bits of the key as the mapping index MI, without performing the hashing operation on the partial random bits. Thus, storage device 100 may not perform the hashing operation for generating the mapping index MI, thereby improving an operation speed. However, embodiments are not limited thereto, and in an embodiment, the mapping table manager MTM may generate the mapping index MI by performing the hashing operation on the partial random bits of the key. Even in this case, since the hashing operation is performed on the random region in which sufficiently random bits are included, rather than on the non-random region in which identical or similar bits are included, the possibility of the occurrence of hashing collision may be reduced.

Figure 5:
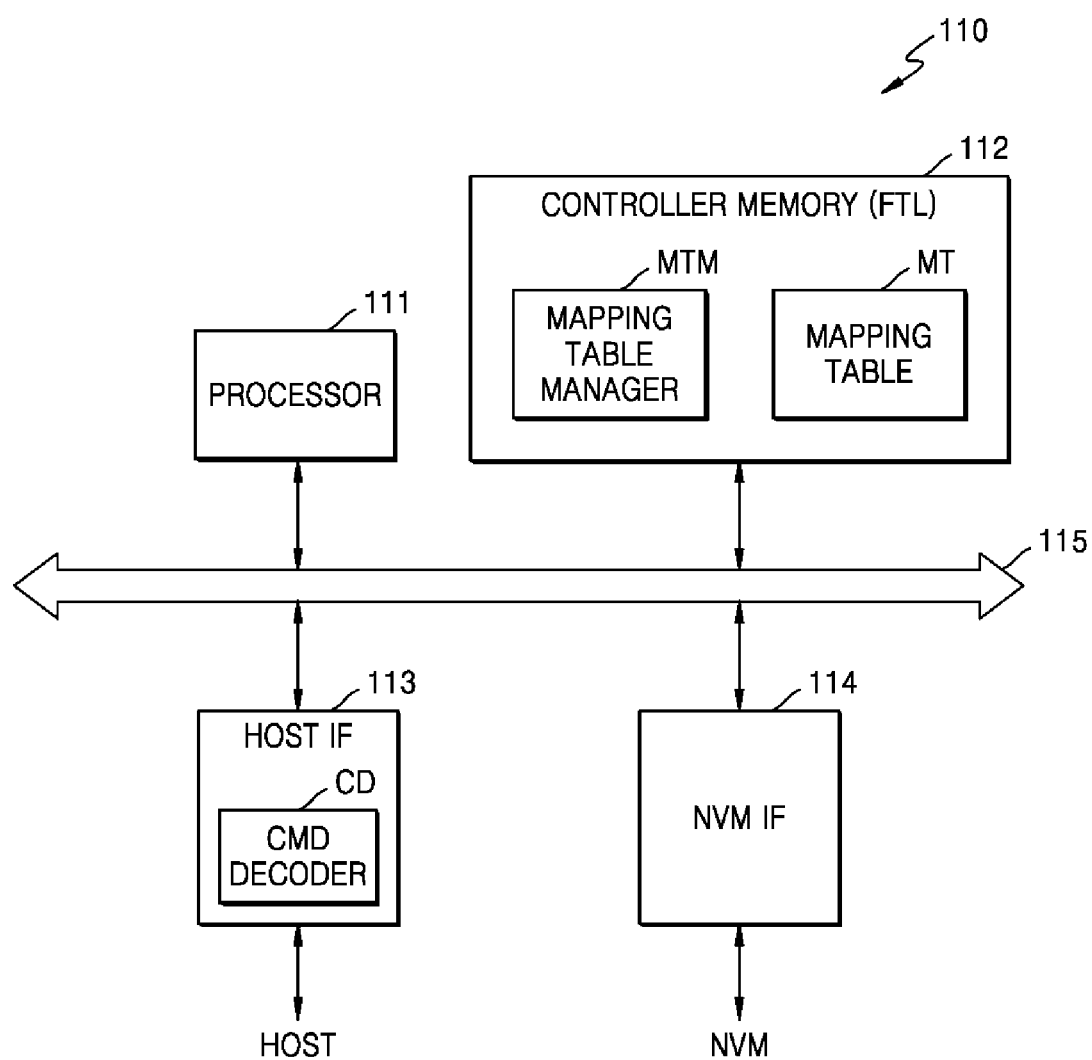
FIG. 5 is a block diagram illustrating a controller of FIG. 1, according to an embodiment.

FIG. 5 is a block diagram illustrating controller 110 of FIG. 1, according to an embodiment. Referring to FIG. 5, controller 110 may include a processor 111, a controller memory 112, a host interface 113, and a non-volatile memory interface 114, and these components may communicate with each other via a bus 115. Processor 111 may include a central processing unit or a microprocessor, and may control overall operations of controller 110. In an embodiment, processor 111 may be implemented with a multi-core processor, for example, a dual-core processor or a quad-core processor.

Host interface 113 may provide an interface between host 200 and controller 110, for example, an interface according to Universal Serial Bus (USB), Multimedia Card (MMC), Peripheral Component Interconnect Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), or the like.

In an embodiment, host interface 113 may include a command decoder CD, and the command decoder CD may separate from each other a key and a value included in the command CMD, by decoding the command CMD received from host 200. In an embodiment, host interface 113 may further include a hashing module performing the hashing operation on the key. However, embodiments are not limited thereto, and the hashing module may be implemented in a Flash Translation Layer (FTL) and thus may be loaded into controller memory 112.

In an embodiment, the hashing module may be activated according to the size of the key or the size of random bits of the key. For example, when the size of the random bits of the key is less than a critical value, the hashing module may be activated. Here, the hashing module may generate a hashed key from the key and provide the generated hashed key to the mapping table manager MTM, and the mapping table manager MTM may use the hashed key as a mapping index. On the other hand, when the size of the random bits is greater than or equal to the critical value, the hashing module may be deactivated. Here, the mapping table manager MTM may use, as the mapping index, at least some of the random bits included in a random region of the key.

Controller memory 112 may be operated according to the control of processor 111, and may be used as operation memory, buffer memory, cache memory, or the like. For example, controller memory 112 may be implemented with volatile memory such as DRAM or SRAM, or non-volatile memory such as PRAM or flash memory. In an embodiment, the mapping table manager MTM and the mapping table MT may be loaded into controller memory 112. The mapping table manager MTM may be implemented with firmware or software, and may be loaded into controller memory 112. In an embodiment, the mapping table manager MTM may be implemented in the FTL. However, embodiments are not limited thereto, and the mapping table manager MTM may be implemented with hardware. For example, the mapping table MT may store a K2P mapping table, and may be loaded into controller memory 112.

Non-volatile memory interface 114 may provide an interface between controller 110 and non-volatile memory 120. For example, the mapping table MT, written data, and read data may be transmitted and received between controller 110 and non-volatile memory 120 via non-volatile memory interface 114. In an embodiment, the number of non-volatile memory interfaces 114 may correspond to the number of non-volatile memory chips included in storage device 100, or the number of channels between controller 110 and non-volatile memory 120.

Figure 6:
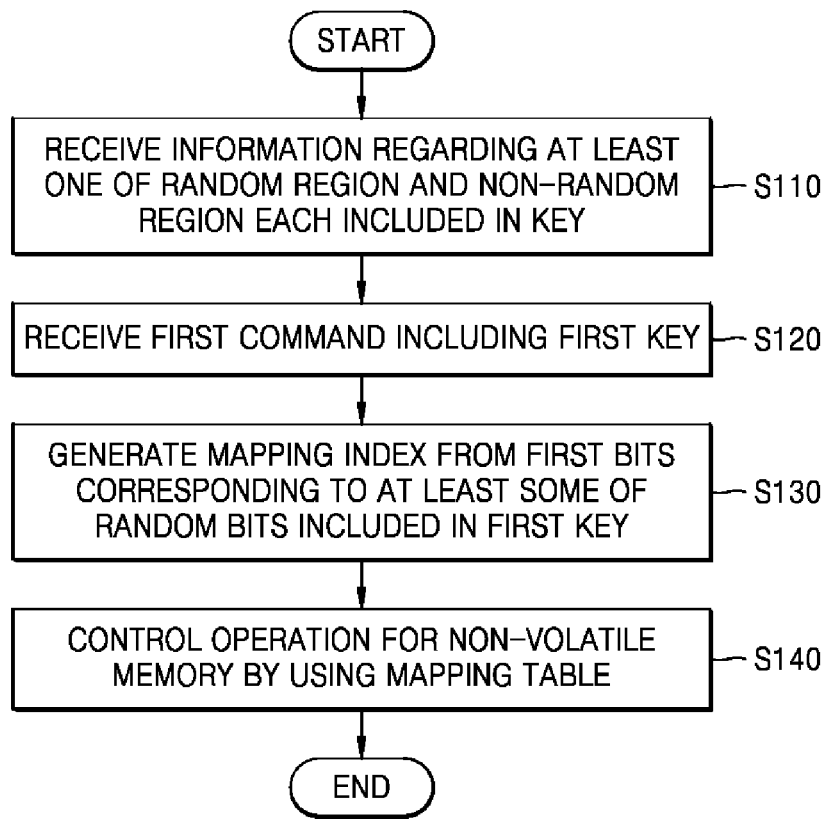
FIG. 6 is a flowchart illustrating a method of operating a key-value storage device, according to an embodiment.

FIG. 6 is a flowchart illustrating a method of operating a key-value storage device, according to an embodiment. Referring to FIG. 6, the method of operating the key-value storage device, according to the present embodiment, may include, for example, operations time-sequentially performed in storage device 100 of FIG. 1. Therefore, the descriptions made above with reference to FIGS. 1 to 5 may be applied to the present embodiment, and repeated descriptions will be omitted.

In operation S110, storage device 100 receives, from host 200, information regarding at least one of a random region and a non-random region each included in a key. Specifically, controller 110 may receive a key encoding rule including the information regarding at least one of the random region and the non-random region each included in the key. In an embodiment, controller 110 may receive, from host 200, a set feature command including the key encoding rule, in an initial stage in which power is applied.

In operation S120, storage device 100 receives, from host 200, a first command including a first key. For example, the first command may be a "put" command including the first key and a first value corresponding to the first key. For example, the first command may be a "get" command including the first key. Specifically, the command decoder CD may decode the first command and thus output the first key. In an embodiment, the command decoder CD may output random bits included in a random region of the first key, based on the key encoding rule KER.

In operation S130, storage device 100 generates a mapping index from first bits corresponding to at least some of the random bits included the first key. Specifically, the mapping table manager MTM may use, as the mapping index, the first bits included the first key, based on the key encoding rule. For example, when the first key has 128 bits, the mapping table manager MTM may extract the first bits corresponding to 32 bits among the random bits included in the first key, and may use the extracted first bits as the mapping index.

In operation S140, storage device 100 controls an operation for the non-volatile memory by using the mapping table. When the first command is a "put" command, controller 110 may store a physical address in a mapping entry corresponding to the generated mapping index, and may control a write operation for non-volatile memory 120 according to the stored physical address. When the first command is a "get" command, controller 110 may retrieve the physical address from the mapping entry corresponding to the generated mapping index, and may control a read operation for non-volatile memory 120 according to the retrieved physical address.

Figure 7:
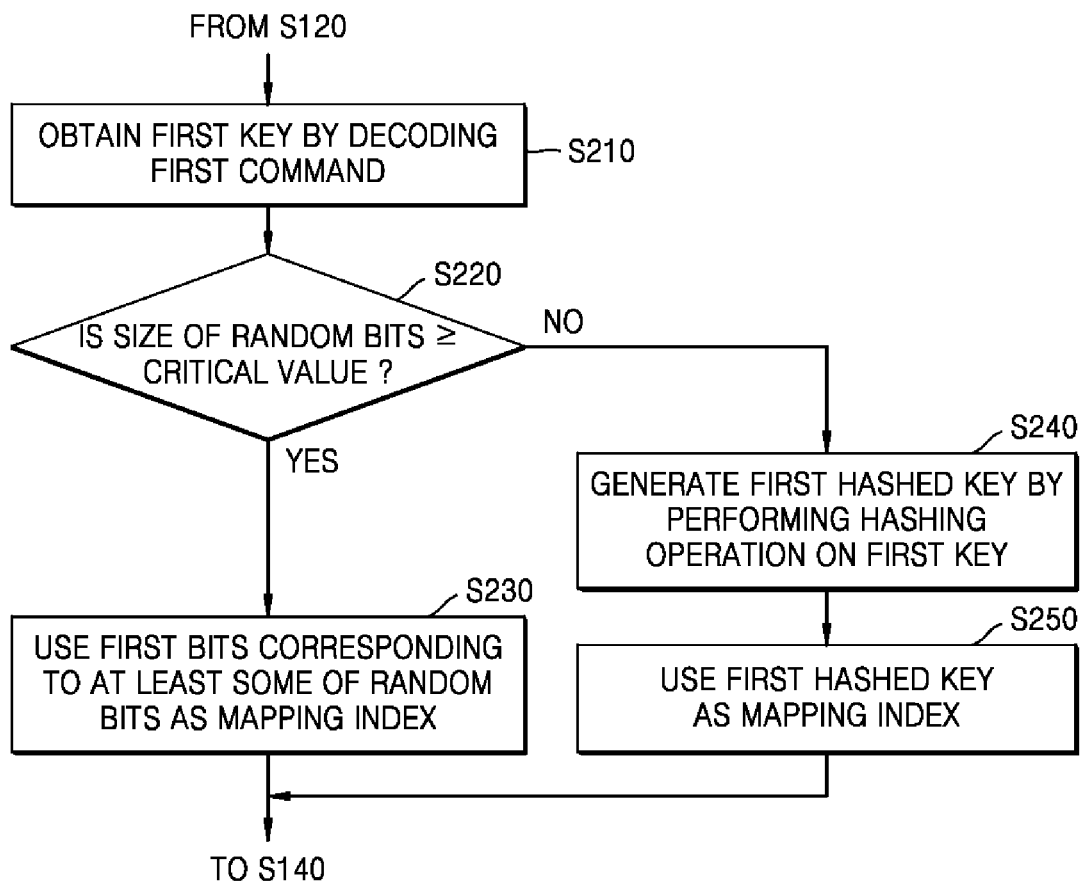
FIG. 7 is a flowchart illustrating a method of generating a mapping index of a key-value storage device, according to an embodiment.

FIG. 7 is a flowchart illustrating a method of generating a mapping index of a key-value storage device, according to an embodiment. Referring to FIG. 7, the method of generating the mapping index may correspond to an implementation example of the method of operating the key-value storage device in FIG. 6. For example, the method of generating the mapping index, according to the present embodiment, may include operations performed corresponding to operation S130 of FIG. 6. For example, the method of generating the mapping index, according to the present embodiment, may include operations time-sequentially performed in controller 110 of FIG. 5.

In operation S210, the first key is obtained by decoding the first command. For example, the command decoder CD may decode the first command to obtain the first key and may provide the obtained first key to the mapping table manager MTM. In operation S220, it is determined whether the size of the random bits is equal to or greater than the critical value. For example, the critical value may correspond to the size of the mapping index. For example, the mapping table manager MTM may determine whether the size of the random bits is greater than or equal to the size of the mapping index. As a result of the determination, when the size of the random bits is greater than or equal to the critical value, operation S230 is performed. On the other hand, when the size of the random bits is less than the critical value, operation S240 is performed. However, embodiments are not limited thereto, and in some embodiments, controller 110 may determine whether the size of the key is greater than or equal to than the critical value.

In operation S230, the first bits corresponding to at least some of the random bits are used as the mapping index MI. In operation S240, a first hashed key is generated by performing the hashing operation on the first key. In operation S250, the first hashed key is used as the mapping index MI. As such, according to the present embodiment, the hashing operation for the first key may be optionally performed depending upon the size of the first key. After operation S230 or operation S250 is performed, operation S170 of FIG. 6 may be performed.

Figure 8:
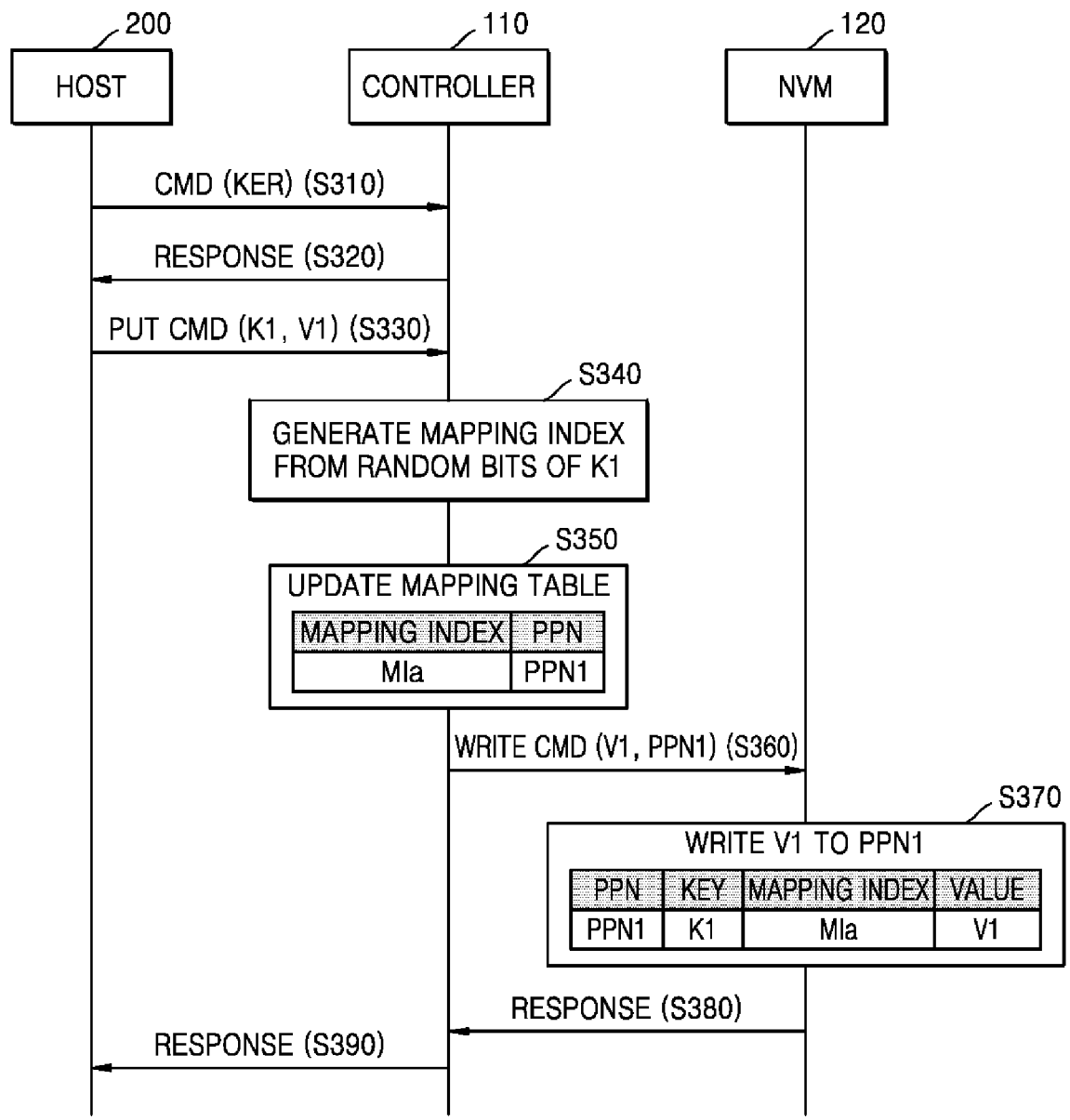
FIG. 8 is a flowchart illustrating a write operation between a host, a controller, and non-volatile memory, according to an embodiment.

FIG. 8 is a flowchart illustrating a write operation between host 200, controller 110, and non-volatile memory 120, according to an embodiment. The write operation according to the present embodiment may correspond to an implementation example of FIG. 6, and hereinafter, descriptions will be made with reference to FIGS. 1 and 8.

In operation S310, host 200 transmits to controller 110 a command including the key encoding rule KER. In operation S320, controller 110 transmits to host 200 a response message indicating the completion of the reception of the command. In operation S330, host 200 transmits, to controller 110, a "put" command including the first key K1 and the first value V1. However, embodiments are not limited thereto, and in some embodiments, host 200 may transmit to controller 110 a "put" command including the key encoding rule KER. In operation S340, controller 110 generates the mapping index MIa from first bits corresponding to at least some of the random bits of the first key K1, based on the key encoding rule KER. In operation S350, controller 110 updates in the mapping table MT a first physical address PPN1 for writing the first value V1 into non-volatile memory 120.

In operation S360, controller 110 transmits to non-volatile memory 120 a write command including the first value V1 and the first physical address PPN1. In operation S370, non-volatile memory 120 writes the first value V1 into the first physical address PPN1. Here, the first key K1 and the first mapping index MIa may be further written into the first physical address PPN1. In operation S380, non-volatile memory 120 transmits to controller 110 a response message indicating the completion of the write operation. In operation S390, controller 110 transmits to host 200 a response message indicating the completion of the write operation of the first value V1.

Figure 9:
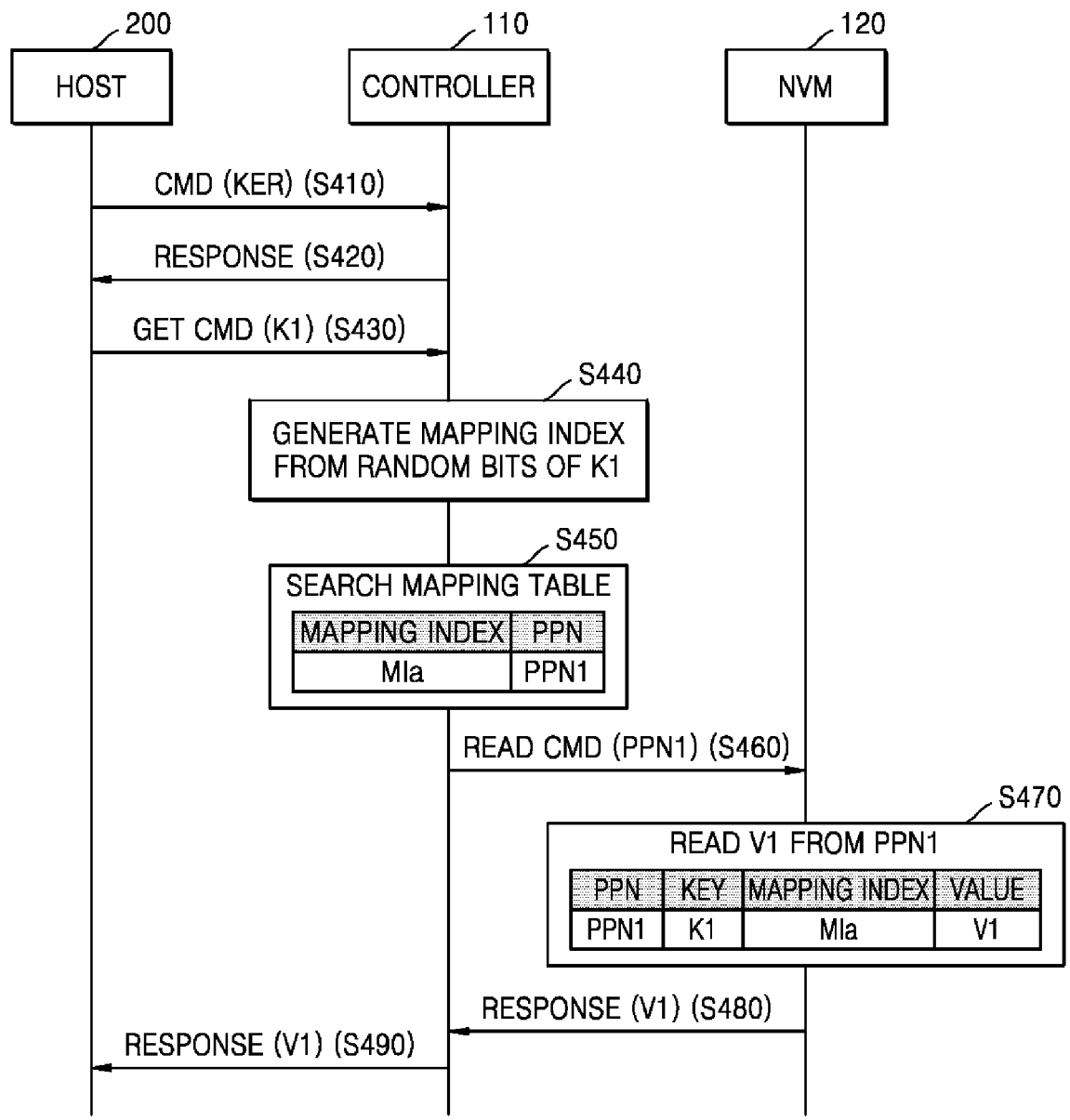
FIG. 9 is a flowchart illustrating a read operation between a host, a controller, and non-volatile memory, according to an embodiment.

FIG. 9 is a flowchart illustrating a read operation between host 200, controller 110, and non-volatile memory 120, according to an embodiment. The read operation according to the present embodiment may correspond to an implementation example of FIG. 6, and hereinafter, descriptions will be made with reference to FIGS. 1 and 9.

In operation S410, host 200 transmits to controller 110 a command including the key encoding rule KER. In operation S420, controller 110 transmits to host 200 a response message indicating the completion of the reception of the command. In operation S430, host 200 transmits to controller 110 a "get" command including the first key K1. In operation S440, controller 110 generates the first mapping index MIa from the random bits of the first key K1, based on the key encoding rule KER. In operation S450, controller 110 retrieves from the mapping table MT the first physical address PPN1 for reading the first value V1 from non-volatile memory 120.

In operation S460, controller 110 transmits to non-volatile memory 120 a read command including the first physical address PPN1. In operation S470, non-volatile memory 120 reads the first value V1 from the first physical address PPN1. Here, the first key K1 and the first mapping index MIa may be further read from the first physical address PPN1. In operation S480, non-volatile memory 120 transmits to controller 110 a response message including the first value V1. In operation S490, controller 110 transmits to host 200 the response message including the first value V1.

Figure 10:
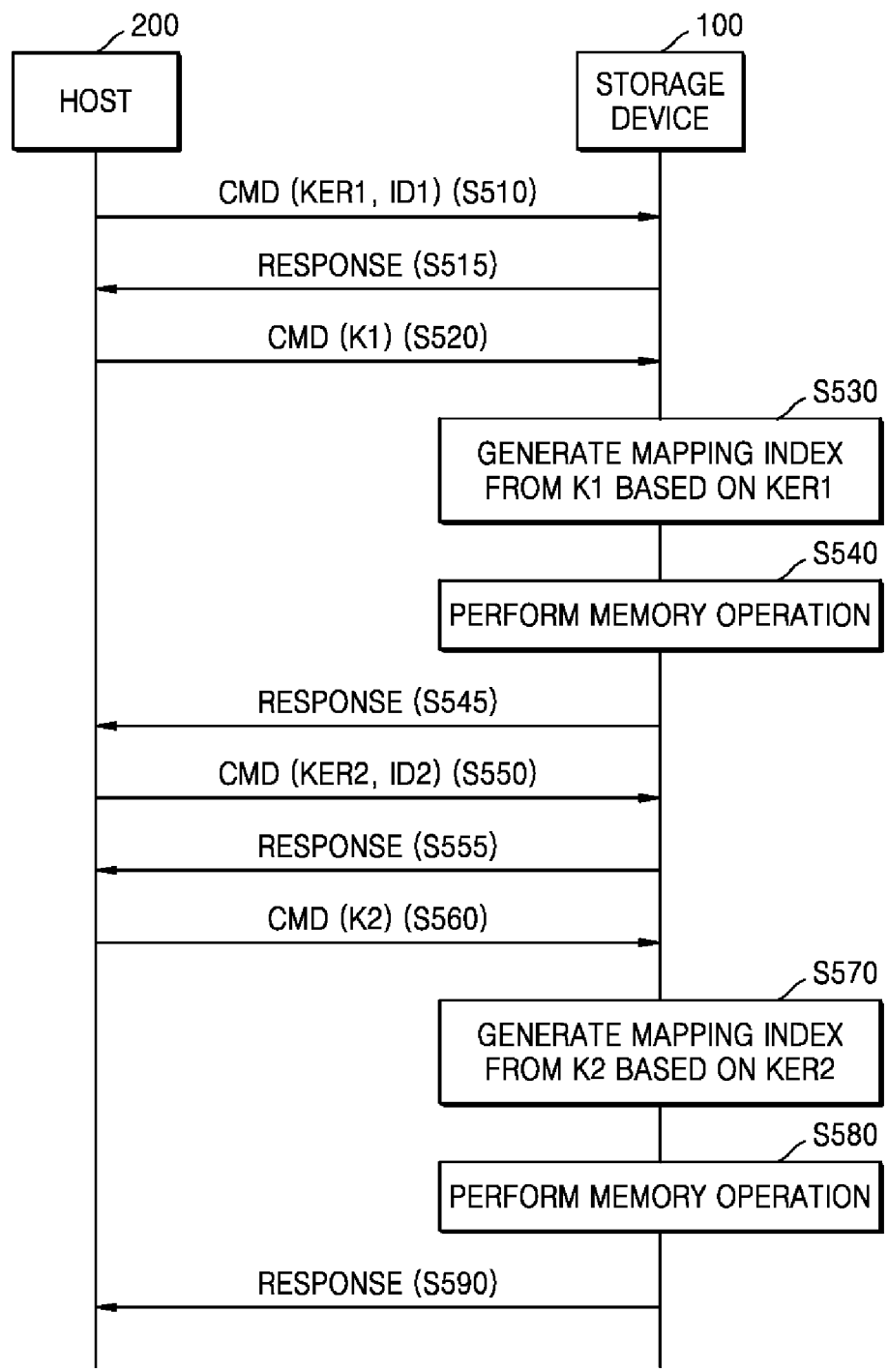
FIG. 10 is a flowchart illustrating a method of performing an operation between a host and a storage device.

FIG. 10 is a flowchart illustrating a method of performing an operation between host 200 and storage device 100.

Referring to FIG. 10, in operation S510, host 200 transmits, to storage device 100, a command including a first key encoding rule KER1 and a first encoding ID ID1. In operation S515, storage device 100 transmits, to host 200, a response message indicating the completion of the reception of the command. In operation S520, host 200 transmits to storage device 100 a command including the first key K1. For example, the command may be a "put" command, a "get" command, or a "delete" command. In operation S530, storage device 100 generates a mapping index from the first key K1, based on the first key encoding rule KER1. In operation S540, storage device 100 performs a memory operation according to the command. For example, when receiving a put command, storage device 100 may perform a value write operation. For example, when receiving a get command, storage device 100 may perform a value read operation. In operation S545, storage device 100 transmits, to host 200, a response message indicating the completion of the memory operation.

In operation S550, host 200 transmits, to storage device 100, a command including a second key encoding rule KER2 and a second encoding ID ID2. In operation S555, storage device 100 transmits to host 200 a response message indicating the completion of the reception of the command. In operation S560, host 200 transmits, to storage device 100, a command including the second key K2. For example, the command may be a "put" command, a "get" command, or a "delete" command. In operation S570, storage device 100 generates a mapping index from the second key K2, based on the second key encoding rule KER2. In operation S580, storage device 100 performs a memory operation according to the command. In operation S590, storage device 100 transmits to host 200 a response message indicating the completion of the memory operation.

As described above, according to the present embodiment, host 200 may change the key encoding rule during the use of storage device 100. Here, host 200 may transmit to storage device 100 an encoding ID corresponding to the key encoding rule together with the key encoding rule, and storage device 100 may separate or distinguish the first encoding rule KER1 from the second encoding rule KER2 according to the encoding ID.

Figure 11:
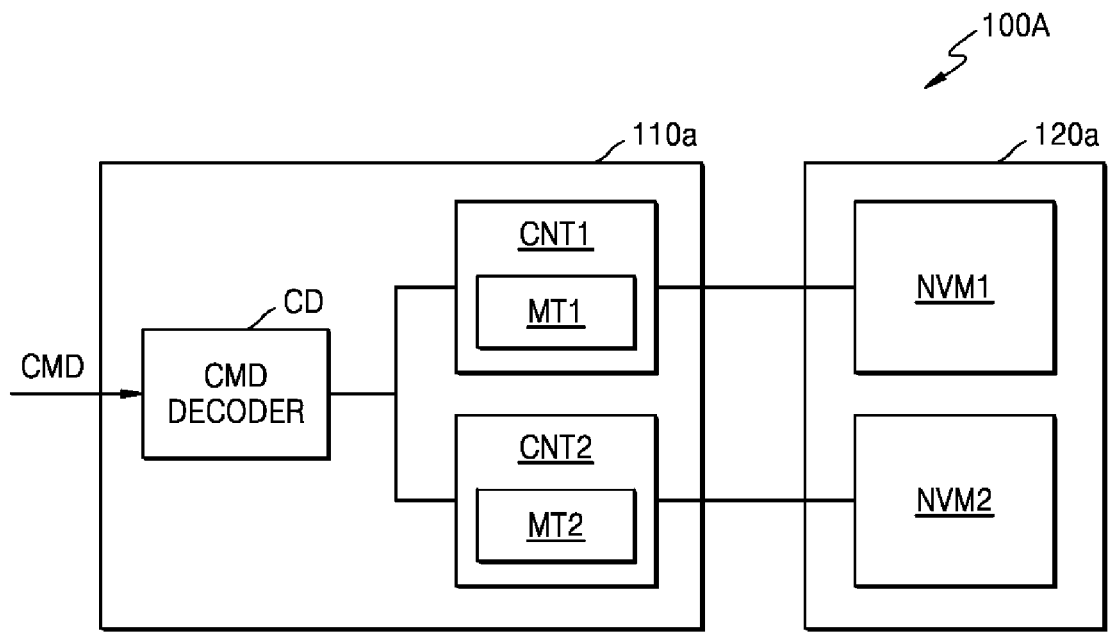
FIG. 11 is a block diagram illustrating an example embodiment of a storage device.

FIG. 11 is a block diagram illustrating an example embodiment of a storage device 100A. Referring to FIG. 11, storage device 100A may include a controller 110a and a non-volatile memory 120a. Controller 110a may include the command decoder CD, and first and second controllers CNT1 and CNT2. Non-volatile memory 120a may include first and second non-volatile memories NVM1 and NVM2. For example, the command decoder CD may be implemented in a Host Interface Layer (HIL) core. For example, the first and second controllers CNT1 and CNT2 may be implemented with dual-core processors.

The first controller CNT1 may control the first non-volatile memory NVM1, and may include a first mapping table MT1 storing mapping information regarding the first non-volatile memory NVM1. The second controller CNT2 may control the second non-volatile memory NVM2, and may include a second mapping table MT2 storing mapping information regarding the second non-volatile memory NVM2. In an embodiment, the first and second non-volatile memories NVM1 and NVM2 may be respectively implemented with individual memory chips different from each other. In an embodiment, the first and second non-volatile memories NVM1 and NVM2 may be respectively connected to the controller 110a via individual channels different from each other.

Figure 12:
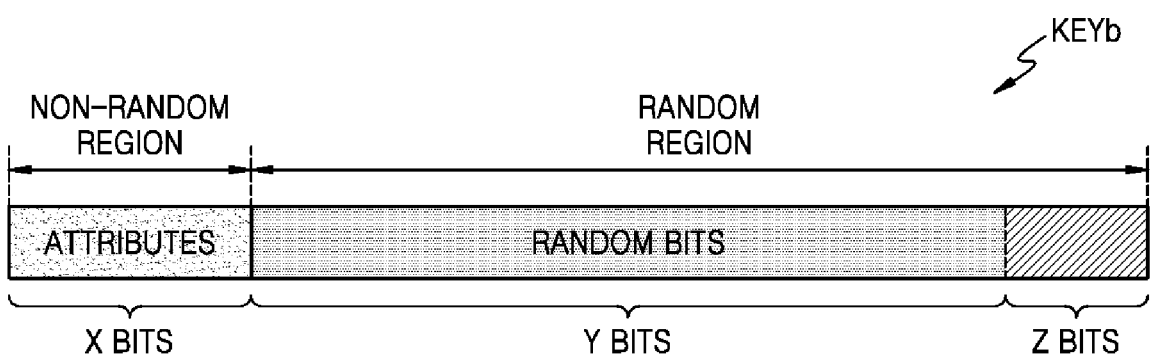
FIG. 12 illustrates an example of a key according to a key encoding rule, according to an embodiment.

FIG. 12 illustrates an example of a key KEYb according to a key encoding rule, according to an embodiment. Referring to FIGS. 11 and 12, the command decoder CD may receive the command CMD from the host, and may generate the key KEYb by decoding the received command CMD. The command decoder CD may divide the key KEYb into non-random bits and random bits according to the key encoding rule, the non-random bits being included in a non-random region, and the random bits being included in a random region. For example, the non-random region of the key KEYb may include X bits, and the random region of the key KEYb may include Y bits and Z bits.

In an embodiment, the command decoder CD may use partial bits out of the random bits as key distribution bits. Specifically, the command decoder CD may use the Z bits out of the random bits as the key distribution bits, and may allocate the key KEYb to the first controller CNT1 or the second controller CNT2, based on the Z bits. For example, the Z bits may be 1 bit. For example, when the Z bits correspond to 0, the command decoder CD may allocate the key KEYb to the first controller CNT1, and when the Z bits correspond to 1, the command decoder CD may allocate the key KEYb to the second controller CNT2.

Figure 13:
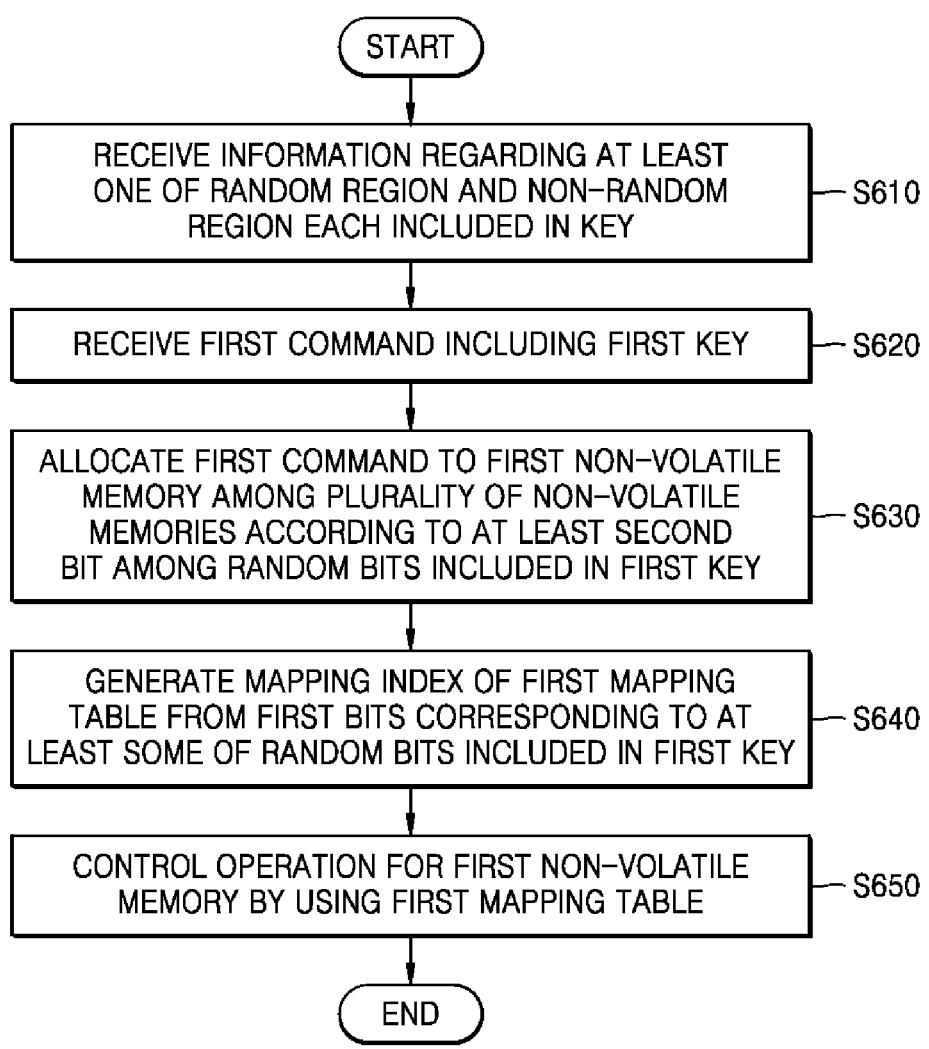
FIG. 13 is a flowchart illustrating a method of operating a key-value storage device, according to an embodiment.

FIG. 13 is a flowchart illustrating a method of operating a key-value storage device, according to an embodiment. Referring to FIG. 13, the method of operating the key-value storage device, according to the present embodiment, may include, for example, operations time-sequentially performed in the storage device 100A.

In operation S610, storage device 100A receives from a host information regarding at least one of a random region and a non-random region each included in a key. Specifically, controller 110a may receive a key encoding rule. In operation S620, storage device 100A receives a first command including a first key. In operation S630, storage device 100A allocates the first command to a first non-volatile memory out of a plurality of non-volatile memories according to at least a second bit out of random bits included in the first key, based on the key encoding rule. For example, the second bit may correspond to the Z bits of FIG. 12.

In operation S640, storage device 100A generates a mapping index of a first mapping table from first bits corresponding to at least some of the random bits included in the first key, based on the key encoding rule. In an embodiment, storage device 100A may use the first bits as the mapping index without performing the hashing operation on the random bits included in the first key. For example, the first bits may correspond to some of the Y bits of FIG. 12. In operation S650, storage device 100A controls an operation for the first non-volatile memory by using the first mapping table.

In some embodiments, the method set forth above may further include, after operation S630, determining, by storage device 100A, whether the size of the random bits is equal to or greater than a critical value. Here, when the size of the random bits is equal to or greater than the critical value, the mapping index may be generated from the first bits. On the other hand, when the size of the random bits is less than the critical value, a first hashed key corresponding to the first key may be generated by performing the hashing operation on the first key, and the generated first hashed key may be used as the mapping index.

Figure 14:
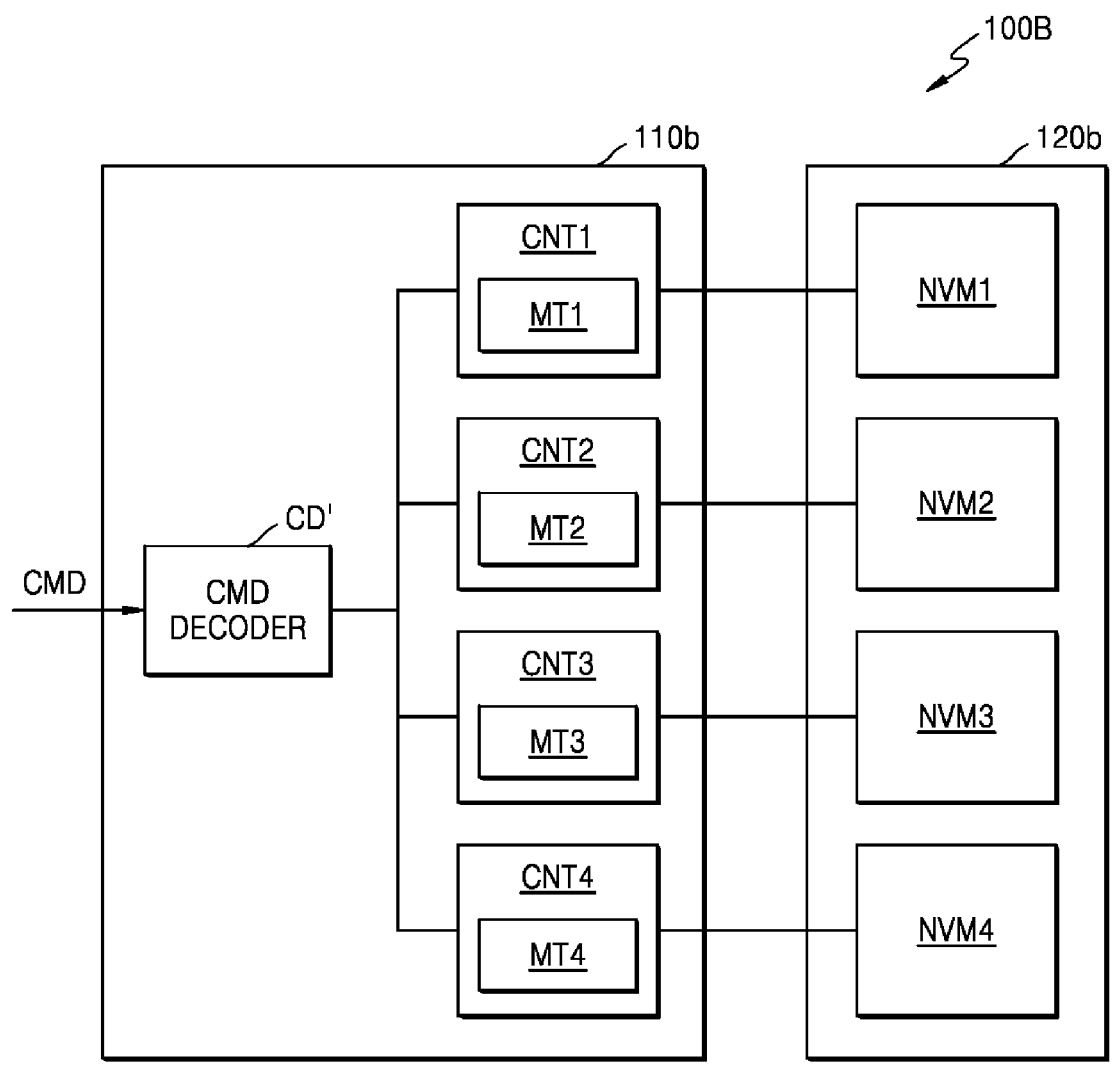
FIG. 14 is a block diagram illustrating an example embodiment of a storage device.

FIG. 14 is a block diagram illustrating an example embodiment of a storage device 100B. Referring to FIG. 14, storage device 100B may correspond to a modified example of storage device 100A of FIG. 11. Storage device 100B may include a controller 110b and a non-volatile memory 120b. Controller 110b may include a command decoder CD' and first to fourth controllers CNT1 to CNT4. Non-volatile memory 120b may include first to fourth non-volatile memories NVM1 to NVM4. For example, the first to fourth controllers CNT1 to CNT4 may be implemented with quad-core processors.

The command decoder CD' may use partial bits (for example, the Z bits of FIG. 12) out of random bits as key distribution bits, and may allocate the key KEYb to one of the first to fourth controllers CNT1 to CNT4, based on the Z bits. For example, the Z bits may be 2 bits. For example, when the Z bits correspond to 00, the command decoder CD' may allocate the key KEYb to the first controller CNT1; when the Z bits correspond to 01, the command decoder CD' may allocate the key KEYb to the second controller CNT2; when the Z bits correspond to 10, the command decoder CD' may allocate the key KEYb to the third controller CNT3; and when the Z bits correspond to 11, the command decoder CD' may allocate the key KEYb to the fourth controller CNT4. The operation method shown in FIG. 13 may also be performed in storage device 100B according to the present embodiment.

Figure 15:
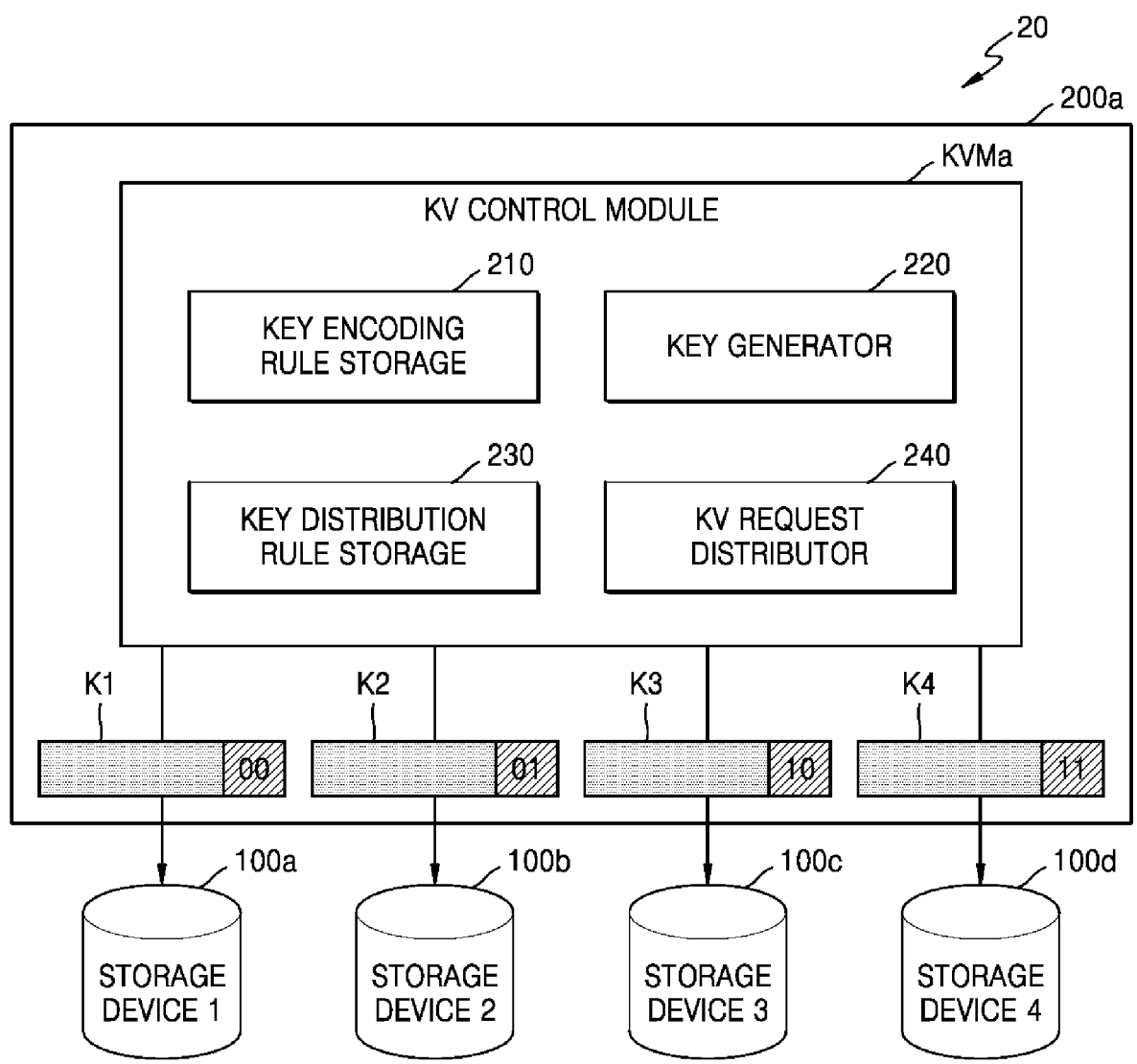
FIG. 15 is a block diagram illustrating an embodiment of a storage system.
Figure 16:
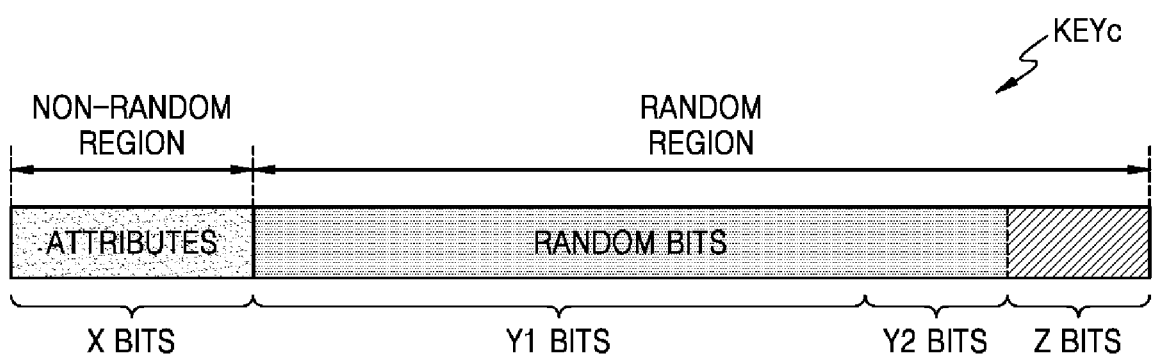
FIG. 16 illustrates an example of a key according to a key encoding rule, according to an embodiment.

FIG. 15 is a block diagram illustrating an embodiment of a storage system 20. FIG. 16 illustrates an example of a key KEYc according to a key encoding rule, according to an embodiment. Hereinafter, descriptions will be made with reference to FIGS. 15 and 16.

Storage system 20 may correspond to a modified example of storage system 10 of FIG. 1. The descriptions made with reference to FIGS. 1 to 14 may be applied to the present embodiment, and repeated descriptions will be omitted. Storage system 20 may include first to fourth storage devices 100a to 100d and a host 200a. Host 200a may include a key-value control module KVMa controlling first to fourth storage devices 100a to 100d. For example, the key-value control module KVMa may be implemented with software.

The key-value control module KVMa may include a key encoding rule storage 210, a key generator 220, key distribution rule storage 230, and a key-value request distributor 240. Key generator 220 may receive a key encoding rule from the key encoding rule storage 210, and may generate the key KEYc based on the received key encoding rule. For example, a non-random region of the key KEYc may include X bits, and a random region of the key KEYc may include Y1 bits, Y2 bits, and Z bits.

Key distribution rule storage 230 may store a key distribution rule for distributing keys generated by key generator 220 to first to fourth storage devices 100a to 100d. For example, key distribution rule storage 230 may store the key distribution rule by which the Z bits corresponding to sub-bits of the random region of the key KEYc are used as key distribution bits. Key-value request distributor 240 may receive the key distribution rule from key distribution rule storage 230, and may allocate a request including the key KEYc to one of first to fourth storage devices 100a to 100d, based on the received key distribution rule.

For example, key-value request distributor 240 may allocate to first storage device 100a a request (for example, a put command or a get command) including a first key K1 in which the Z bits correspond to 00. For example, key-value request distributor 240 may allocate to second storage device 100b a request including a second key K2 in which the Z bits correspond to 01. For example, key-value request distributor 240 may allocate to third storage device 100c a request including a third key K3 in which the Z bits correspond to 10. For example, key-value request distributor 240 may allocate to fourth storage device 100d a request including a fourth key K4 in which the Z bits correspond to 11.

Figure 17:
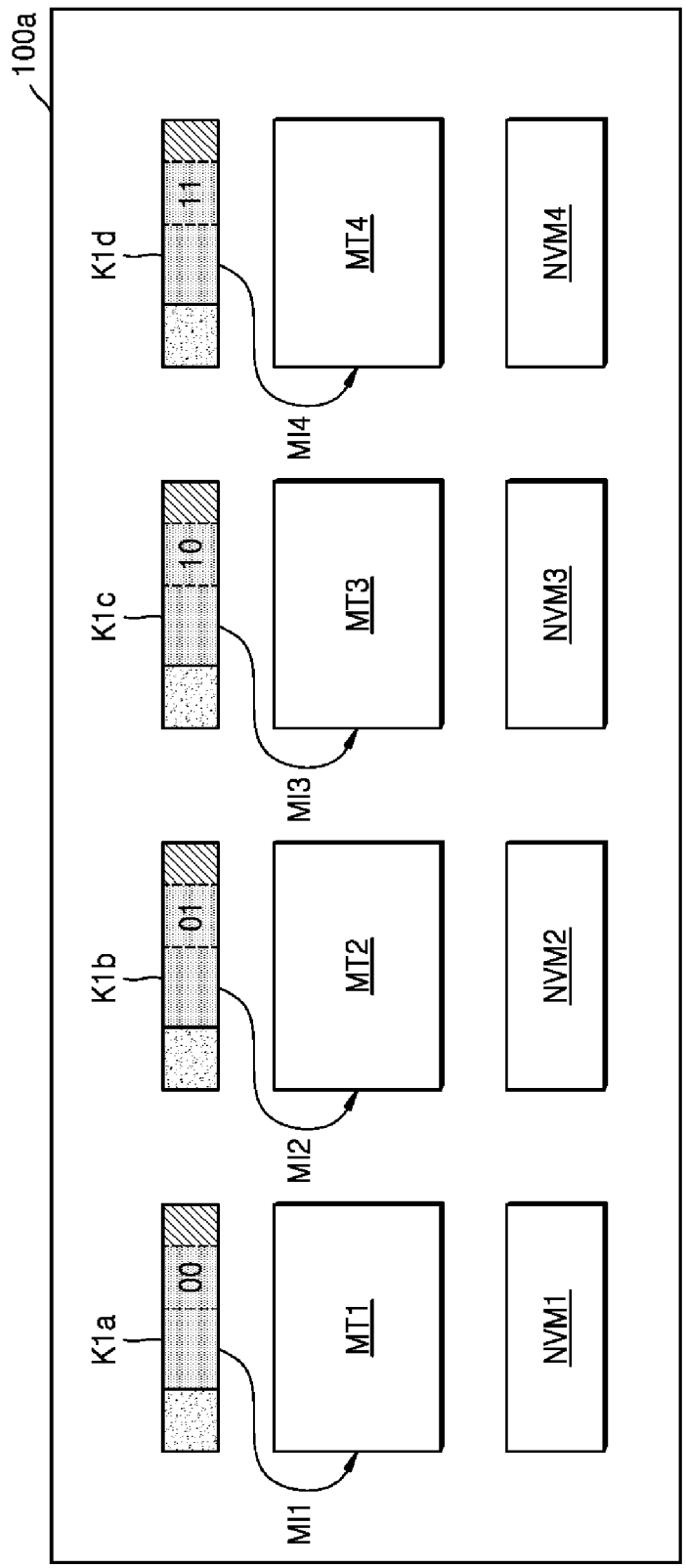
FIG. 17 illustrates an embodiment of a first storage device of FIG. 15.

FIG. 17 illustrates an embodiment of first storage device 100a of FIG. 15. Although not shown, second to fourth storage devices 100b to 100d of FIG. 15 may also be implemented substantially similarly to first storage device 100a. Therefore, descriptions made below with reference to FIG. 17 may be applied to second to fourth storage devices 100b to 100d.

Referring to FIG. 17, first storage device 100a may include first to fourth mapping tables MT1 to MT4 and first to fourth non-volatile memories NVM1 to NVM4, and may respectively control the first to fourth non-volatile memories NVM1 to NVM4 by using the first to fourth mapping tables MT1 to MT4. First storage device 100a may receive a key encoding rule from host 200a. In addition, first storage device 100a may also receive a key distribution rule from host 200a.

First storage device 100a may allocate a key to one of the first to fourth non-volatile memories NVM1 to NVM4, based on partial bits (for example, the Y2 bits of FIG. 16) out of random bits of the key. For example, first storage device 100a may allocate, to the first non-volatile memory NVM1, a first key K1a in which the Y2 bits correspond to 00; may allocate, to the second non-volatile memory NVM2, a second key K1b in which the Y2 bits correspond to 01; may allocate, to the third non-volatile memory NVM3, a third key K1c in which the Y2 bits correspond to 10; and may allocate, to the fourth non-volatile memory NVM4, a fourth key K1d in which the Y2 bits correspond to 11.

First storage device 100a may generate the first mapping table MT1 from at least partial bits out of random bits of the first key K1a (for example, at least partial bits out of the Y1 bits of FIG. 16), and may store, in the first mapping table MT1, mapping information corresponding to a first mapping index MI1. Likewise, first storage device 100a may respectively generate second to fourth mapping indices MI2 to MI4 from at least partial bits out of random bits of the second to fourth keys K1b to K1d. In addition, first storage device 100a may respectively store, in the mapping tables MT2 to MT4, mapping information corresponding to the second to fourth mapping indices MI2 to MI4.

Figure 18:
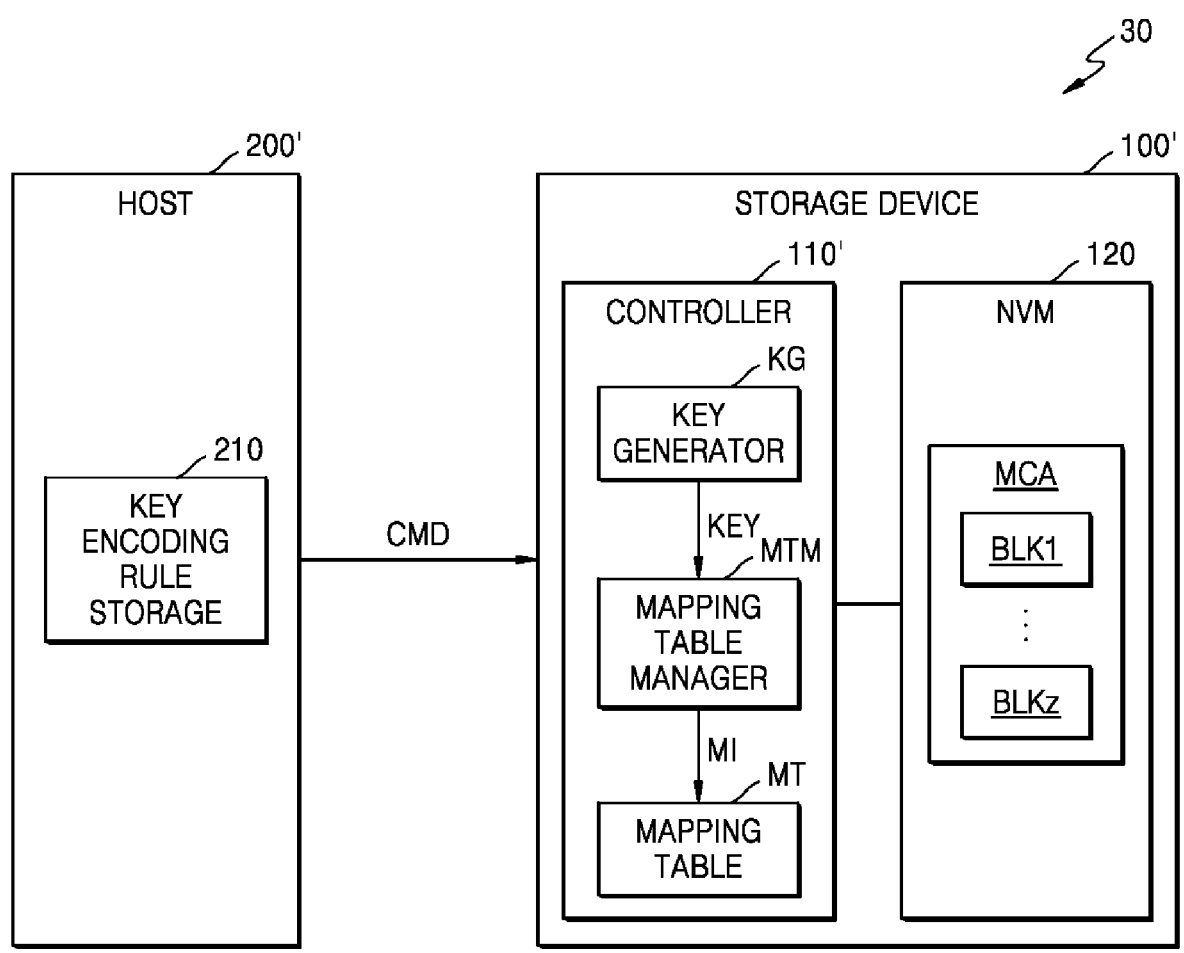
FIG. 18 is a block diagram illustrating a storage system according to an embodiment.

FIG. 18 is a block diagram illustrating an embodiment of a storage system 30. Storage system 30 according to the present embodiment may correspond to a modified example of storage system 10 of FIG. 1.

Referring to FIG. 18, storage system 30 may include a storage device 100' and a host 200', and storage device 100' may include a controller 110' and non-volatile memory 120. Host 200' may include key encoding rule storage 210, and controller 110' may include a key generator KG, the mapping table manager MTM, and the mapping table MT. Unlike in storage system 10 of FIG. 1, according to the present embodiment, the key generator KG may be included in controller 110' rather than in host 200'.

Host 200' may transmit a key encoding rule to storage device 100', before transmitting the command CMD. Next, host 200' may transmit, to storage device 100', the command CMD including a value. The key generator KG may generate a key KEY from the command CMD based on the key encoding rule. The mapping table manager MTM may receive the key KEY from the key generator KG, and may generate the mapping index MI from at least some of random bits of the received key KEY. In addition, the mapping table manager MTM may store, in the mapping table MT, mapping information corresponding to the mapping index MI.

Figure 19:
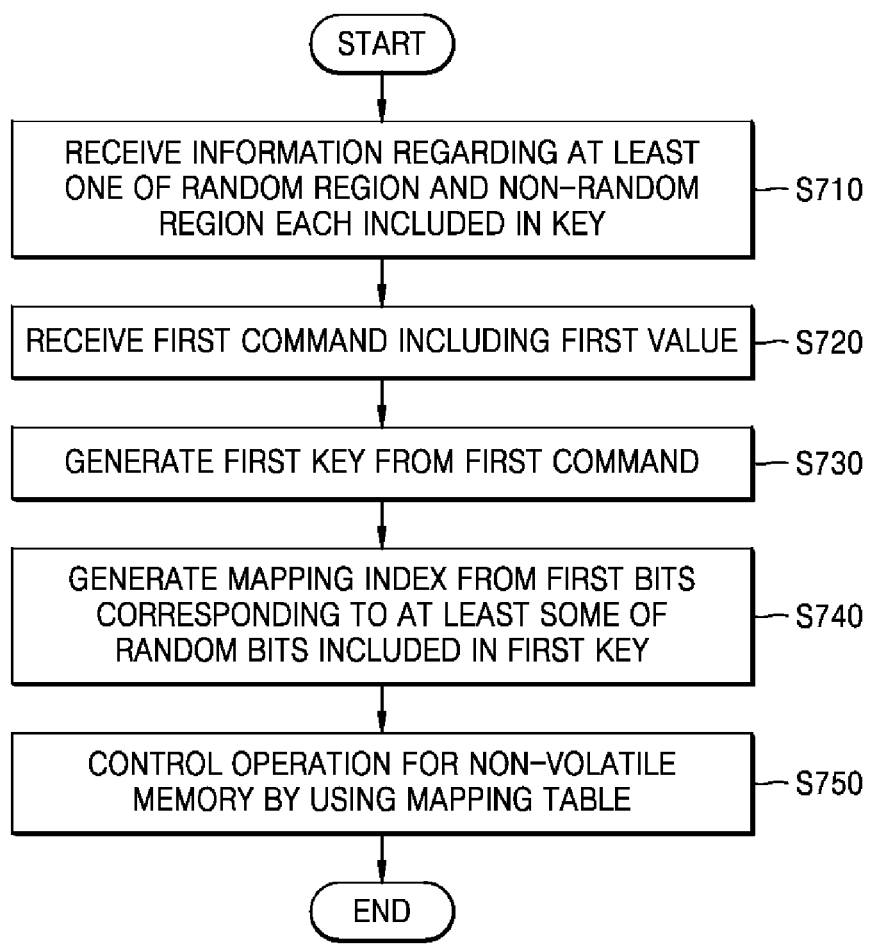
FIG. 19 is a flowchart illustrating a method of operating a key-value storage device, according to an embodiment.

FIG. 19 is a flowchart illustrating a method of operating a key-value storage device, according to an embodiment. Referring to FIG. 19, the method of operating the key-value storage device, according to the present embodiment, may include, for example, operations time-sequentially performed in storage device 100' of FIG. 18.

In operation S710, storage device 100' receives from host 200' information regarding at least one of a random region and a non-random region each included in a key. Specifically, controller 110' may receive a key encoding rule. In operation S720, storage device 100' receives from host 200' a first command including a first value. In operation S730, storage device 100' generates a first key from the first command, based on the key encoding rule.

In operation S740, storage device 100' generates a mapping index from first bits corresponding to at least some of the random bits included in the first key, based on the key encoding rule. In an embodiment, storage device 100' may use the first bits as the mapping index, without performing the hashing operation on the random bits included in the first key. For example, the first bits may correspond to some of the Y bits of FIG. 12. In operation S750, storage device 100' controls an operation for the non-volatile memory by using the mapping table.

Figure 20:
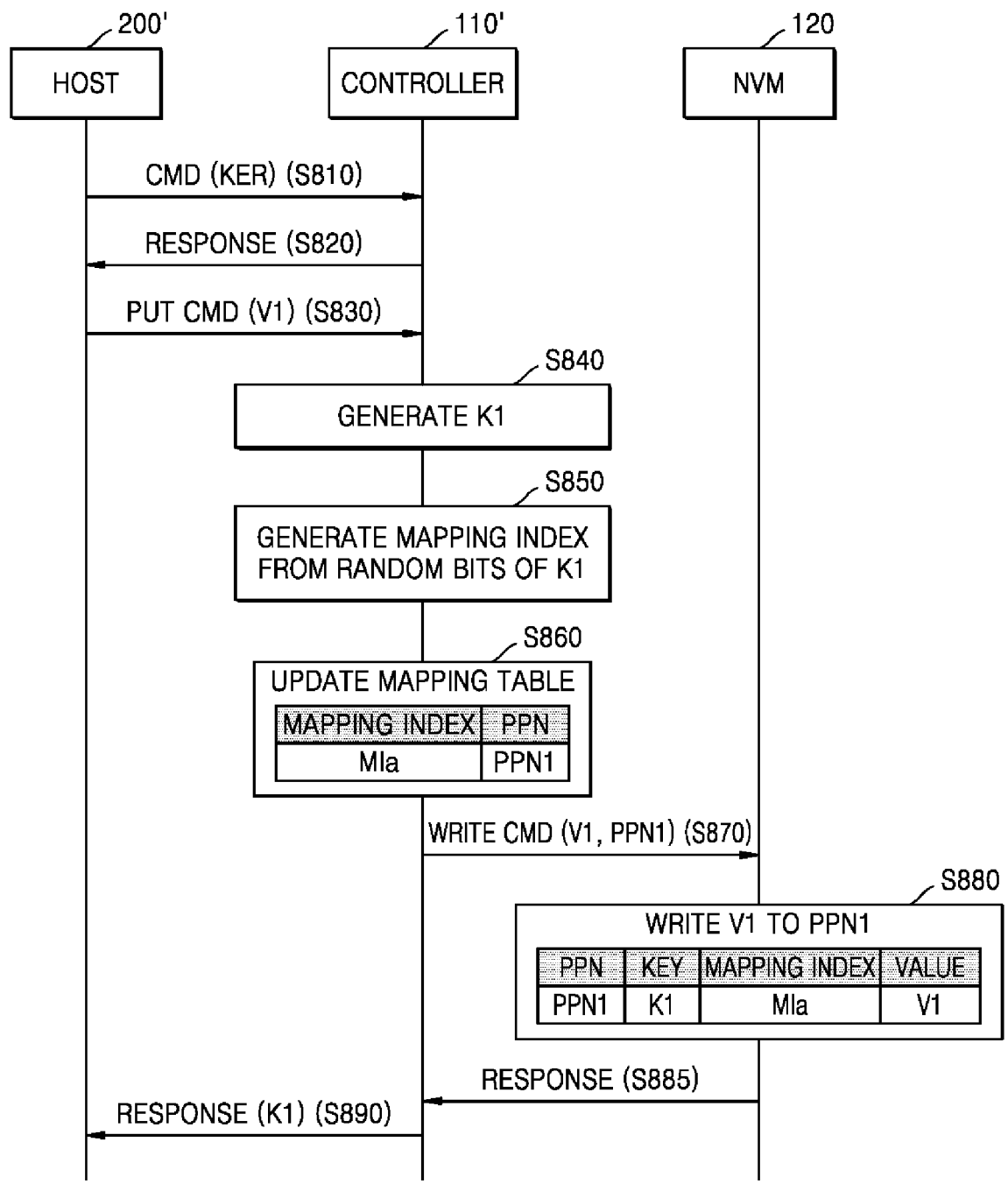
FIG. 20 is a flowchart illustrating a write operation between a host, a controller, and non-volatile memory, according to an embodiment.

FIG. 20 is a flowchart illustrating a write operation between host 200', controller 110', and non-volatile memory 120, according to an embodiment. The write operation according to the present embodiment may correspond to an implementation example of FIG. 19, and hereinafter, descriptions will be made with reference to FIGS. 18 to 20.

In operation S810, host 200' transmits to controller 110' a command including a key encoding rule. In operation S820, controller 110' transmits to host 200' a response message indicating the completion of the reception of the command. In operation S830, host 200' transmits to controller 110' a put command including the first value V1. However, embodiments are not limited thereto, and in some embodiments, host 200' may transmit, to controller 110', a put command including the key encoding rule.

In operation S840, the controller 110' generates the first key K1 from the first value V1, based on the key encoding rule. In operation S850, controller 110' generates the mapping index MIa from the random bits of the first key K1. In operation S860, controller 110' updates, to the mapping table MT, the first physical address PPN1 for writing the first value V1 into non-volatile memory 120.

In operation S870, controller 110' transmits to non-volatile memory 120 a write command including the first value V1 and the first physical address PPN1. In operation S880, non-volatile memory 120 writes the first value V1 into the first physical address PPN1. Here, the first key K1 and the first mapping index MIa may be further written into the first physical address PPN1. In operation S885, non-volatile memory 120 transmits to controller 110' a response message indicating the completion of the write operation. In operation S890, controller 110' transmits to host 200' a response message indicating the completion of the write operation of the first value V1.

Figure 21:
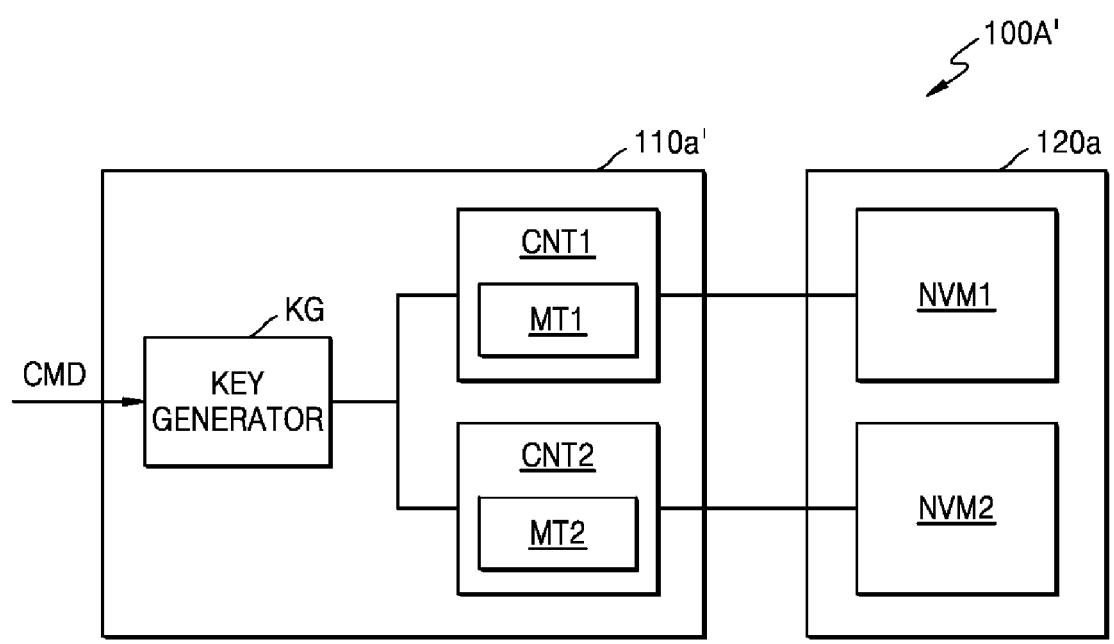
FIG. 21 is a block diagram illustrating an example embodiment of a storage device.

FIG. 21 is a block diagram illustrating an example embodiment of a storage device 100A'. Referring to FIG. 21, storage device 100A' may include a controller 110a' and non-volatile memory 120a. storage device 100A' may correspond to a modified example of storage device 100A of FIG. 11, and the descriptions made with reference to FIG. 11 may be applied to the present embodiment. Controller 110a' may include the key generator KG and the first and second controllers CNT1 and CNT2. Non-volatile memory 120a may include the first and second non-volatile memories NVM1 and NVM2. For example, the key generator KG may be implemented in the HIL core. For example, the first and second controllers CNT1 and CNT2 may be implemented with dual-core processors.

Figure 22:
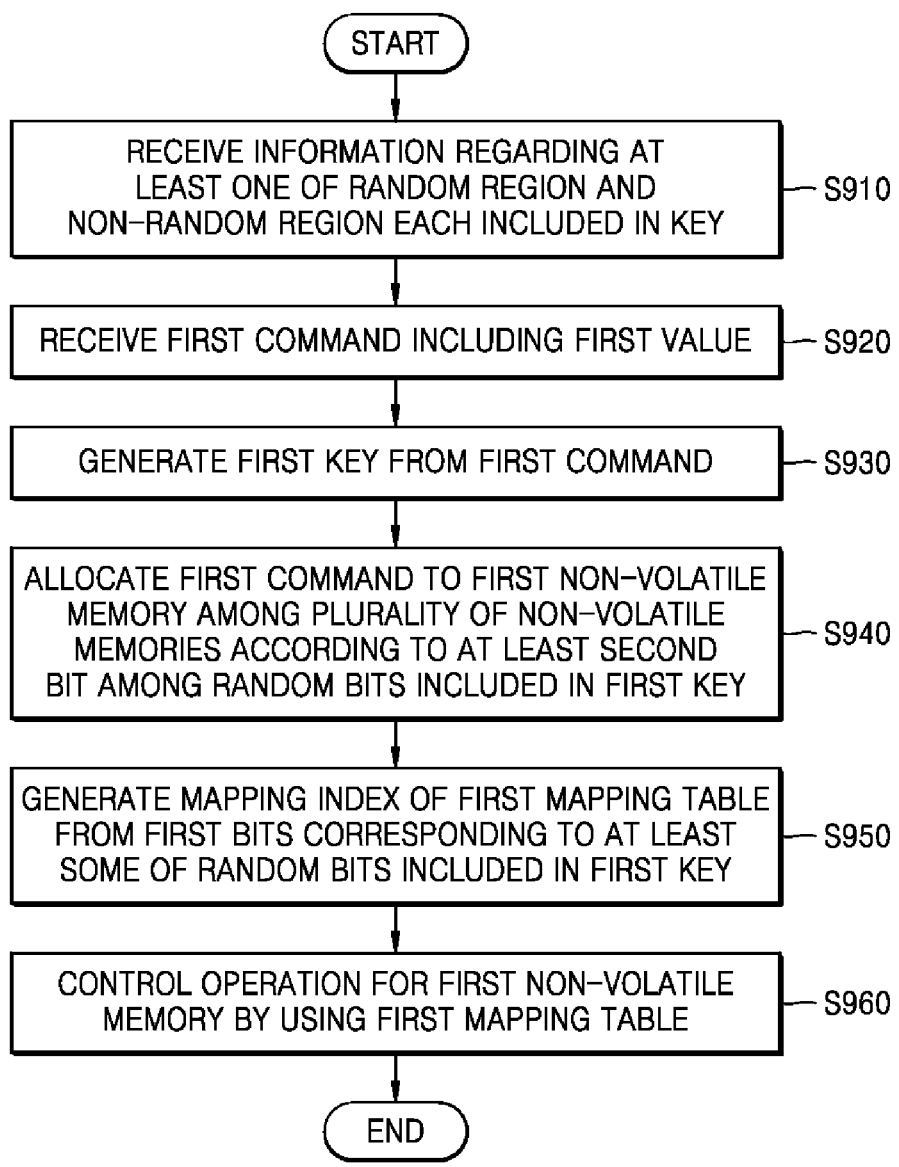
FIG. 22 is a flowchart illustrating a method of operating a key-value storage device, according to an embodiment.

FIG. 22 is a flowchart illustrating a method of operating a key-value storage device, according to an embodiment. Referring to FIG. 22, the method of operating the key-value storage device, according to the present embodiment, may include, for example, operations time-sequentially performed in storage device 100A' of FIG. 21.

In operation S910, storage device 100A' receives from a host information regarding at least one of a random region and a non-random region each included in a key. Specifically, controller 110a' may receive a key encoding rule. In operation S920, storage device 100A' receives a first command including a first value. In operation S930, storage device 100A' generates a first key from the first command based on the key encoding rule. For example, the key generator KG may generate the first key corresponding to the first value, based on the key encoding rule.

In operation S940, storage device 100A' allocates the first command to a first non-volatile memory out of a plurality of non-volatile memories according to at least a second bit out of random bits included in the first key, based on the key encoding rule. For example, the second bit may correspond to the Z bits of FIG. 12. In operation S950, storage device 100A' generates a mapping index of a first mapping table from first bits corresponding to at least some of the random bits included in the first key, based on the key encoding rule. In an embodiment, storage device 100A' may use the first bits as the mapping index, without performing the hashing operation on the random bits included in the first key. For example, the first bits may correspond to some of the Y bits of FIG. 12. In operation S960, the storage device 100N controls an operation for the first non-volatile memory by using the first mapping table.

Figure 23:
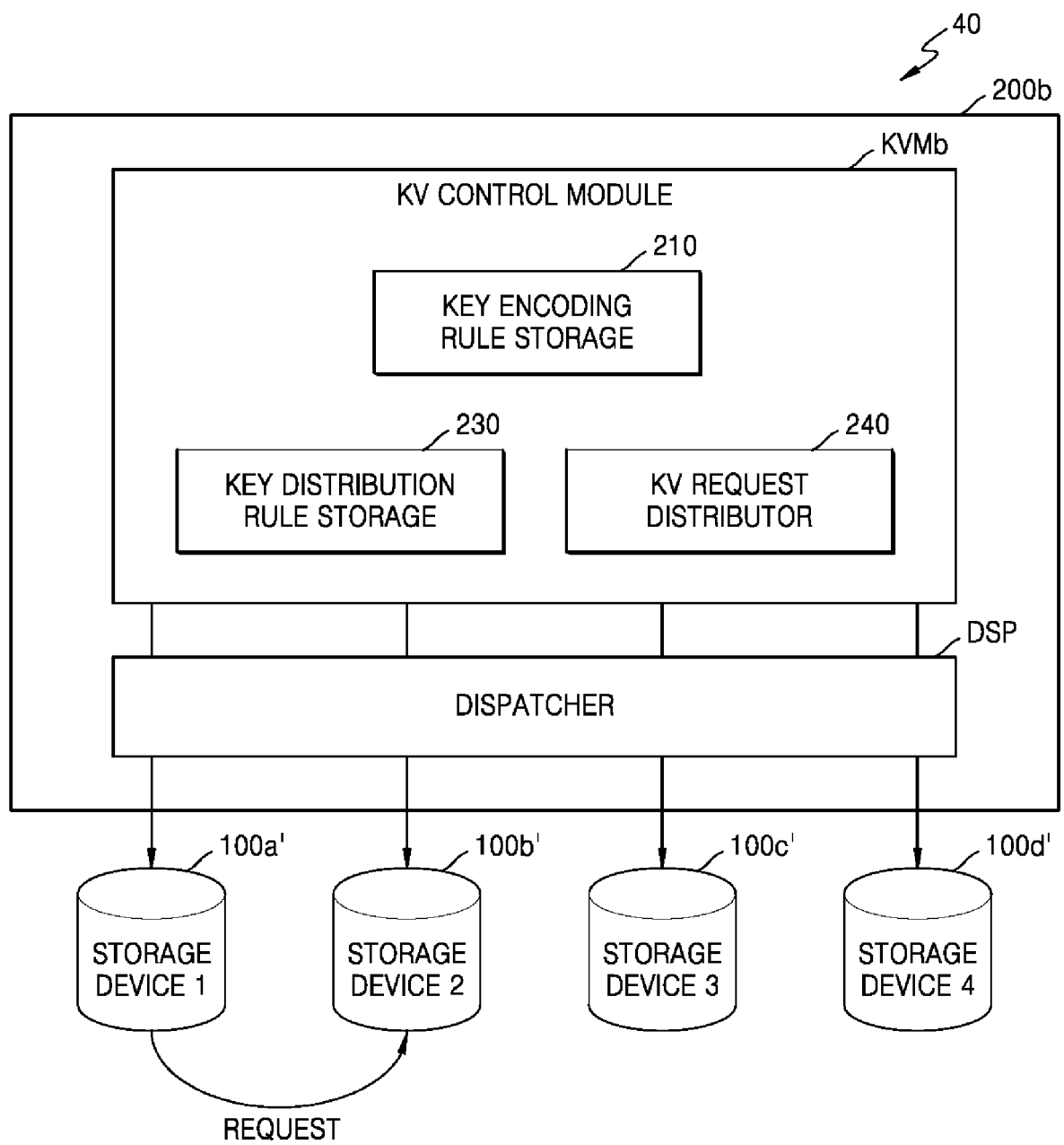
FIG. 23 is a block diagram illustrating an embodiment of a storage system.

FIG. 23 is a block diagram illustrating an embodiment of a storage system 40. Storage system 40 according to the present embodiment may correspond to a modified example of storage system 30 of FIG. 18.

Referring to FIG. 23, storage system 40 may include first to fourth storage devices 100a' to 100d' and a host 200b. Host 200b may include a key-value control module KVMb and a dispatcher DSP, the key-value control module KVMb controlling first to fourth storage devices 100a' to 100d'. For example, the key-value control module KVMb may be implemented with software.

The key-value control module KVMb may include key encoding rule storage 210, key distribution rule storage 230, and key-value request distributor 240. host 200b may transmit, in advance, a key encoding rule stored in key encoding rule storage 210, to first to fourth storage devices 100a' to 100d'. In addition, host 200b may transmit, in advance, a key distribution rule stored in key distribution rule storage 230, to first to fourth storage devices 100a' to 100S. In an embodiment, key-value request distributor 240 may be activated when host 200b issues a read request, and may be deactivated when host 200b issues a write request. Specifically, key-value request distributor 240 may allocate a read request for a value to one of first to fourth storage devices 100a' to 100d'.

The dispatcher DSP may dispatch values generated in host 200b to first to fourth storage devices 100a' to 100d'. For example, the dispatcher DSP may be a round robin dispatcher, and may schedule, in a round robin manner, the values generated in host 200b to dispatch the values to first to fourth storage devices 100a' to 100d'. Specifically, since host 200b does not generate a key corresponding to the value, the dispatcher DSP may perform dispatch in a round robin manner. In an embodiment, the dispatcher DSP may be activated when host 200b issues a read request, and may be deactivated when host 200b issues a write request.

When receiving the value, each of first to fourth storage devices 100a' to 100d' may generate a key corresponding to the value based on the key encoding rule, and may transmit, to host 200b, a response message including key data regarding the generated key. Thus, even though host 200b does not directly generate the key, host 200b may manage a key-value pair based on the key data received from first to fourth storage devices 100a' to 100d'. key-value request distributor 240 may allocate a read request for the value to one of first to fourth storage devices 100a' to 100d', based on the key data received from first to fourth storage devices 100a' to 100d'.

Figure 24:
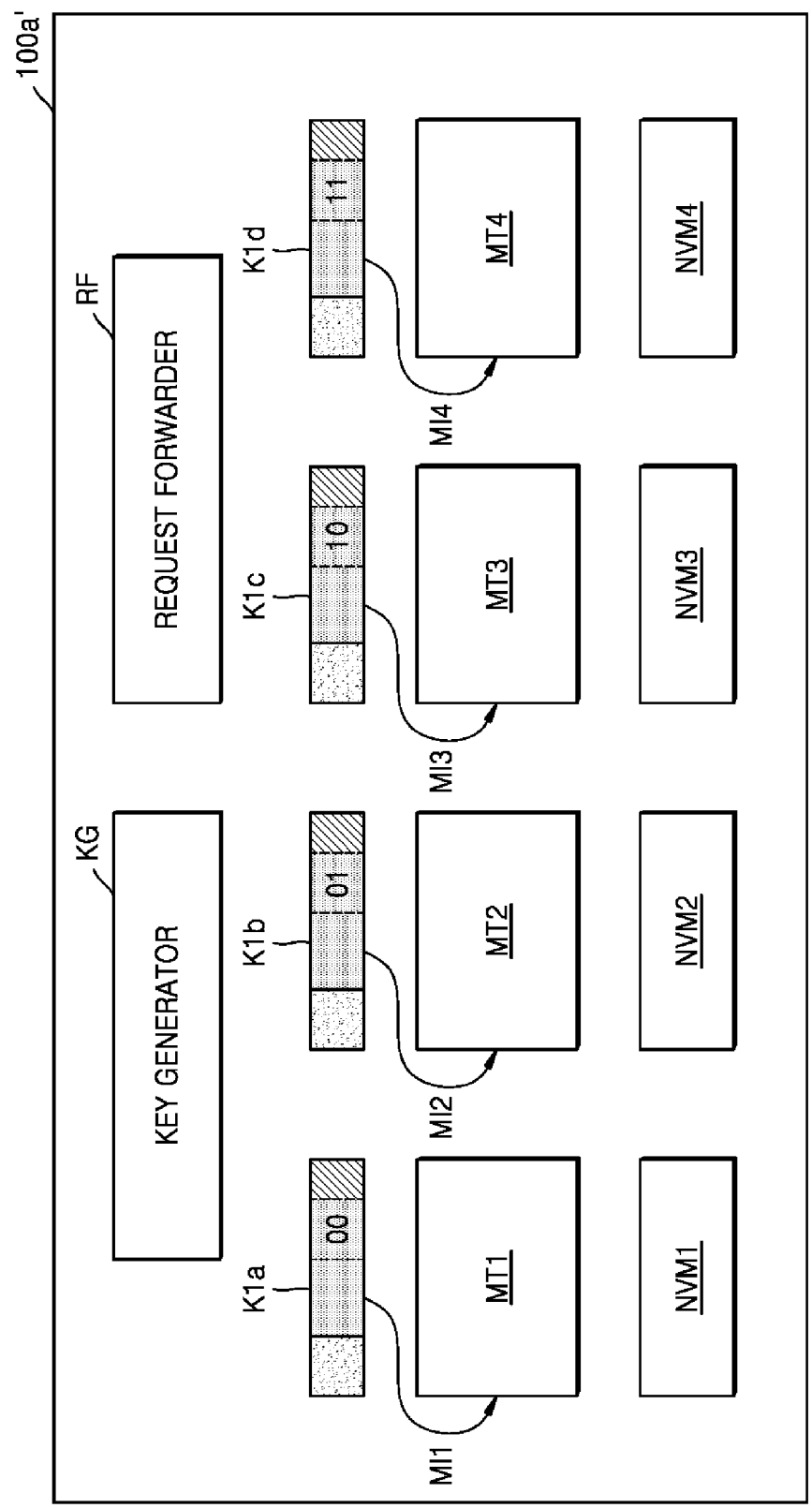
FIG. 24 illustrates an embodiment of a first storage device of FIG. 23.

FIG. 24 illustrates an embodiment of first storage device 100a' of FIG. 23. Although not shown, second to fourth storage devices 100b' to 100d' of FIG. 23 may also be implemented substantially similarly to first storage device 100a'. Therefore, descriptions made below with reference to FIG. 24 may be applied to second to fourth storage devices 100b' to 100d'.

Referring to FIGS. 23 and 24, first storage device 100a' may include the first to fourth mapping tables MT1 to MT4 and the first to fourth non-volatile memories NVM1 to NVM4, and may respectively control the first to fourth non-volatile memories NVM1 to NVM4 by using first to fourth mapping tables MT1 to MT4. In addition, first storage device 100a' may further include the key generator KG and a request forwarder RF.

When first storage device 100a' receives a first value, the key generator KG may generate a first key from the first value based on the key encoding rule. In addition, first storage device 100a' may allocate, to one of first to fourth storage devices 100a' to 100d', a write request including the first key and the first value, according to partial bits (for example, the Z bits of FIG. 16) out of random bits of the first key, based on the key encoding rule. For example, when the Z bits of the first key correspond to 00, first storage device 100a' may allocate the write request to first storage device 100a'. For example, when the Z bits of the first key correspond to 01, first storage device 100a' may allocate the write request to second storage device 100b'. For example, when the Z bits of the first key correspond to 10, first storage device 100a' may allocate the write request to third storage device 100c'. For example, when the Z bits of the first key correspond to 11, first storage device 100a' may allocate the write request to fourth storage device 100d'. When the write request is allocated to one of second to fourth storage devices 100b' to 100d', the request forwarder RF may forward the write request to one of second to fourth storage devices 100b' to 100d'.

When a write request is allocated to first storage device 100a', first storage device 100a' may allocate a key to one of the first to fourth non-volatile memories NVM1 to NVM4, based on partial bits (for example, the Y2 bits of FIG. 16) out of random bits of the key. In addition, first storage device 100a' may generate one of the first to fourth mapping indices MI1 to MI4 from at least partial bits out of random bits of each of the first to fourth keys K1a to K1d (for example, at least partial bits out of the Y1 bits of FIG. 16), and may respectively store, in the mapping tables MT1 to MT4, mapping information corresponding to the first to fourth mapping indices MI1 to MI4.

Figure 25:
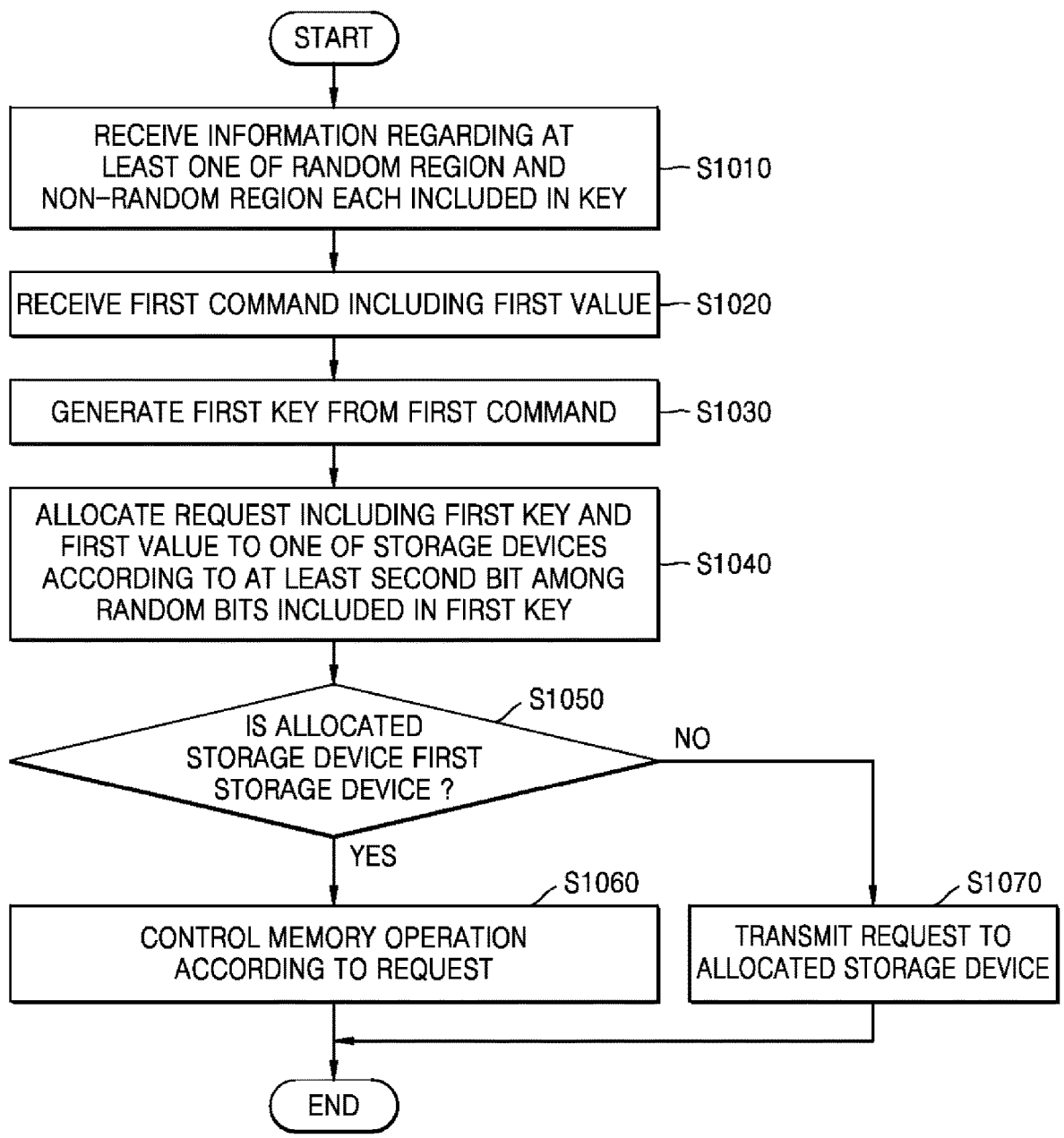
FIG. 25 is a flowchart illustrating a method of operating a key-value storage device, according to an embodiment.

FIG. 25 is a flowchart illustrating a method of operating a key-value storage device, according to an embodiment. Referring to FIG. 25, the method of operating the key-value storage device, according to the present embodiment, may include, for example, operations time-sequentially performed in first storage device 100a' of FIG. 24.

In operation S1010, first storage device 100a' receives from a host information regarding at least one of a random region and a non-random region each included in a key. Specifically, first storage device 100a' may receive a key encoding rule including the information regarding at least one of the random region and the non-random region each included in the key. In operation S1020, first storage device 100a' receives a first command including a first value. In operation S1030, first storage device 100a' generates a first key from the first command, based on the key encoding rule.

In operation S1040, first storage device 100a' allocates to one of a plurality of storage devices a write request including the first key and the first value, according to at least a second bit out of random bits included in the first key, based on the key encoding rule. In operation S1050, first storage device 100a' determines whether the allocated storage device is a first storage device. As a result of the determination, if the allocated storage device is the first storage device, operation S1060 is performed, and if not, operation S1070 is performed. In operation S1060, first storage device 100a' controls a memory operation according to the write request. In operation S1070, first storage device 100a' transmits the write request to another storage device to which the write request is allocated.

Figure 26:
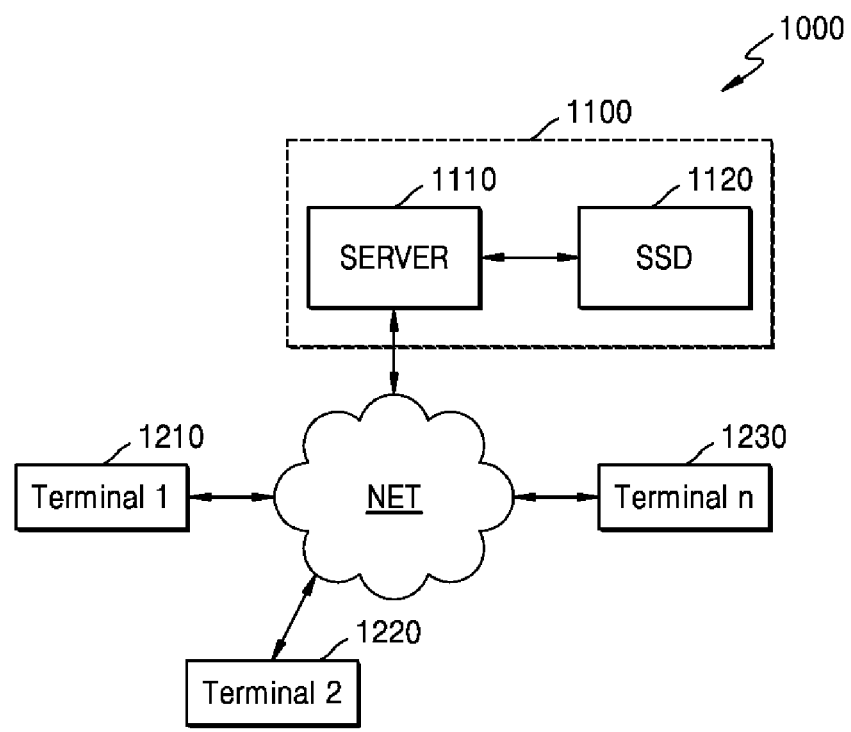
FIG. 26 illustrates an embodiment of a network system.

FIG. 26 illustrates an embodiment of a network system 1000.

Referring to FIG. 26, network system 1000 may include a server system 1100 and a plurality of terminals 1210 to 1230 communicating with server system 1100 via a network NET. Server system 1100 may include a server 1110 and an SSD 1120. Here, server 1110 may correspond to the host in the embodiments described above, and SSD 1120 may correspond to the storage device in the embodiments described above. In an embodiment, SSD 1120 may be implemented by using the embodiments described with reference to FIGS. 1 to 25.

Figure 27:
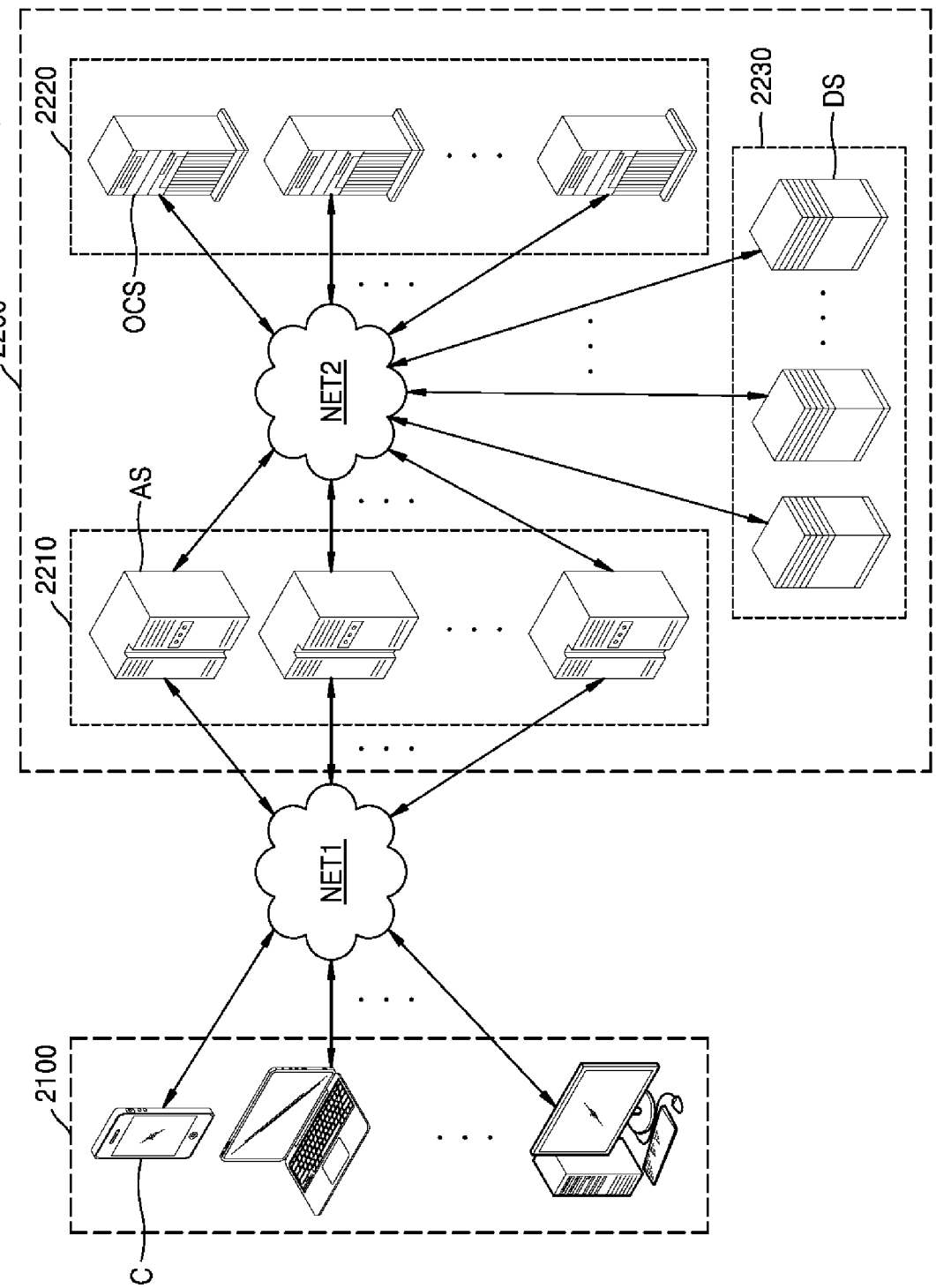
FIG. 27 illustrates an embodiment of a network system.

FIG. 27 illustrates an embodiment of a network system 2000.

Referring to FIG. 27, network system 2000 may include a client group 2100 and a data center 2200. Client group 2100 may include client devices C communicating with data center 2200 via a first network NET1, for example, via Internet, data center 2200 is a facility storing various gathered data and providing services, and may include an application server group 2210, a database server group 2220, and an object cache server group 2230, which communicate with each other via a second network NET2, for example, a local area network (LAN) or an intranet.

Application server group 2210 may include application server devices AS, and the application server devices AS may process a request received from client group 2100, and may access database server group 2220 or object cache server group 2230 according to the request of client group 2100. Database server group 2220 may include database server devices DS storing data processed by the application server devices AS. Object cache server group 2230 may include object cache server devices OCS temporarily storing data which is stored in the database server devices DS or read from the database server devices DS, and thus, may perform a function of a cache between the application server devices AS and the database server devices DS. In an embodiment, the object cache server devices OCS may be implemented by using the embodiments described with reference to FIGS. 1 to 25.

Figure 28:
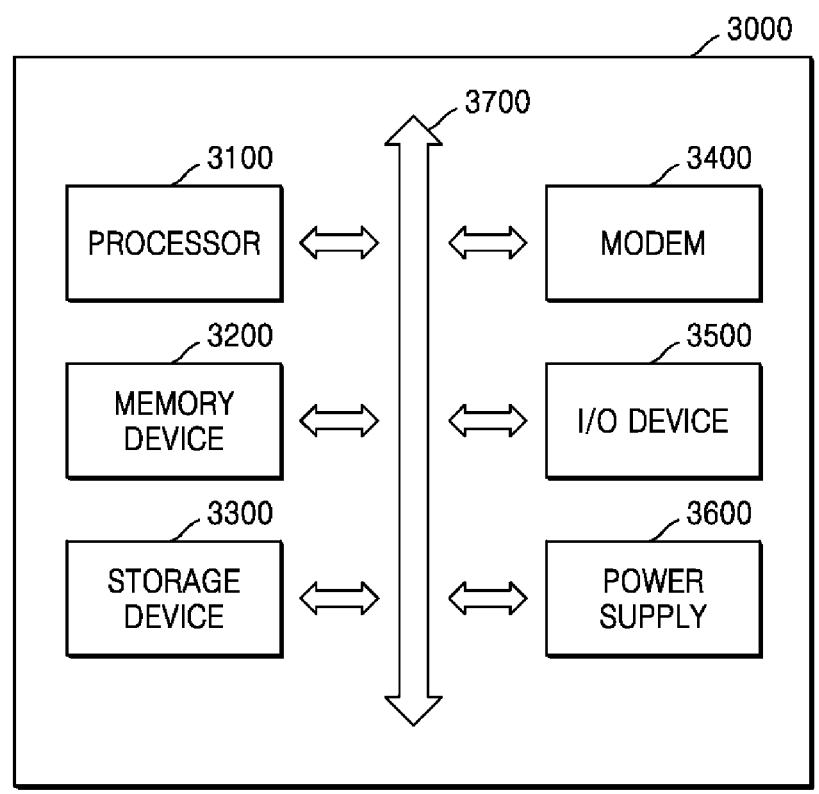
FIG. 28 illustrates an embodiment of an electronic device.

FIG. 28 illustrates an electronic device 3000 according to an embodiment of the inventive concept. Referring to FIG. 28, electronic device 3000 may include a processor 3100, a memory device 3200, a storage device 3300, a modem 3400, an input/output device 3500, and a power supply 3600. In an embodiment, storage device 3300 may be implemented by using the embodiments described with reference to FIGS. 1 to 25.

The various operations of methods described above may be performed by any suitable means capable of performing the operations, such as various hardware and/or software component(s), circuits, and/or module(s). The software may comprise an ordered listing of executable instructions for implementing logical functions, and can be embodied in any "processor-readable medium" for use by or in connection with an instruction execution system, apparatus, or device, such as a single or multiple-core processor or processor-containing system.

Various blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been particularly shown and described with reference to embodiments thereof, it will be understood that various changes in form and details may be made therein without departing from the spirit and scope of the following claims.

What is claimed is:

1. A storage system comprising:
a non-volatile memory; and
a controller configured to receive from a host:
a command including a key, the key including a random region and a non-random region, the random region including random bits, and the non-random region including attribute information regarding a value associated with the key, the attribute information being represented by bits having a certain pattern, and the bits indicating a type of file to which the key provides access; and
a key encoding rule including information regarding at least one of the random region and the non-random region,
wherein the controller is further configured to generate, based on the key encoding rule, a mapping index from bits corresponding to some of the random bits included in the random region and is further configured to store, in a mapping table, mapping information which maps the mapping index to a physical address of the non-volatile memory, and
wherein the non-volatile memory is configured to store, under control of the controller and according to the physical address of the mapping information, the key and the value corresponding to the key.

2. The storage system of claim 1, wherein:
the controller is configured to receive the key encoding rule before receiving the command.

3. The storage system of claim 1, wherein:
the controller comprises:
a processor;
a host interface for interfacing the controller to the host; and
a controller memory operatively connected to the processor, and the mapping table is stored in the controller memory.

4. The storage system of claim 3, wherein:
the command further includes a value corresponding to the key, and
the host interface includes:
a command decoder configured to decode the command and to separate the key and the value from each other; and
a hashing module configured to perform a hashing operation on the key to generate the mapping index.

5. The storage system of claim 4, wherein the hashing module is configured to perform the hashing operation according to the key and information included in the key encoding rule.

6. The storage system of claim 5, wherein:
the information included in the key encoding rule includes a critical value, and
the hashing module is configured to perform the hashing operation only when a size of the key is less than the critical value.

7. The storage system of claim 1, wherein the type of file is a video file or a picture file.

8. A method of operating a key-value storage device, wherein the key-value storage device comprises a non-volatile memory and a controller configured to control the non-volatile memory, the method comprising:
receiving, by the controller and from a host, information regarding at least one of a random region comprising random bits and a non-random region each included in a first key, the non-random region including attribute information regarding a first value associated with the first key, the attribute information being represented by bits having a certain pattern, and the bits indicating a type of file to which the first key provides access;

receiving, by the controller and from the host, a write command comprising the first key and the first value;

generating by the controller, based on the information, a mapping index of a mapping table from first bits, the first bits corresponding to some of the random bits included in the random region of the first key;

after generating the mapping index, storing in the mapping table a first physical address for writing the first value into the non-volatile memory; and controlling, by the controller, an operation for the non-volatile memory according to the write command by using the mapping table.

9. The method of claim 8, wherein the generating of the mapping index comprises generating the mapping index by performing a hashing operation on the first bits.

10. The method of claim 8, further comprising:
receiving, by the controller and from the host, a read command comprising the first key; and
retrieving from the mapping table the first physical address into which the first value corresponding to the first key is written.

11. The method of claim 8, further comprising, after receiving the write command, the controller determining whether a size of the random bits is equal to or greater than a critical value.

12. The method of claim 11, wherein:
the size of the random bits is equal to or greater than the critical value, and
the method further comprising generating the mapping index from the first bits.

13. The method of claim 11, wherein:
the size of the random bits is less than the critical value,
the method further comprising generating a first hashed key corresponding to the first key by performing a hashing operation on the first key, and
the first hashed key is used as the mapping index.

14. The method of claim 8, wherein:
the non-volatile memory comprises a plurality of non-volatile memory devices, and
the method further comprising, after receiving the write command, allocating the first key to a first non-volatile memory device among the plurality of non-volatile memory devices based on at least one second bit among the random bits.

15. The method of claim 8, wherein:
the receiving of the information comprises receiving, from the host, first information, and
the first information comprises a first key encoding rule including second information regarding at least one of the random region and the non-random region and a first encoding identifier (ID) corresponding to the first key encoding rule.

16. The method of claim 15, further comprising:
after controlling of operation for the non-volatile memory, receiving from the host third information, wherein the third information comprises:
a second key encoding rule which is different than the first key encoding rule, and
a second encoding ID, corresponding to the second key encoding rule, which is different than the first encoding ID.

17. A method of operating a key-value storage device, wherein the key-value storage device comprises a plurality of non-volatile memories and a controller configured to control the plurality of non-volatile memories, the method comprising:
receiving, by the controller and from a host, information regarding at least one of a random region comprising random bits and a non-random region each included in a first key, the non-random region including attribute information regarding a first value associated with the first key, the attribute information being represented by bits having a certain pattern, and the bits indicating a type of file to which the first key provides access;
receiving, by the controller and from the host, a write command comprising the first key and the first value;
allocating, by the controller, the write command to a first non-volatile memory among the plurality of non-volatile memories according to at least a second bit among the random bits included in the random region of the first key, based on the information;
generating, by the controller and based on the information, a mapping index of a first mapping table from first bits, the first mapping table corresponding to the first non-volatile memory and the first bits corresponding to some of the random bits included in the first key;
after generating the mapping index, storing in the first mapping table a first physical address for writing the first value into the first non-volatile memory; and
controlling, by the controller, an operation for the first non-volatile memory according to the write command, by using the first mapping table.

18. The method of claim 17, further comprising, after the allocating of the write command to the first non-volatile memory, determining by the controller whether a size of the random bits is equal to or greater than a critical value.

19. The method of claim 18, wherein:
the size of the random bits is equal to or greater than the critical value, and
the method further comprising generating the mapping index from the first bits.

20. The method of claim 18, wherein:
the size of the random bits is less than the critical value,
the method further comprising generating a first hashed key corresponding to the first key by performing a hashing operation on the first key, and
the first hashed key is used as the mapping index.

* * * * *